United States Patent [19]
Rasmussen et al.

[11] Patent Number: 5,719,528
[45] Date of Patent: Feb. 17, 1998

[54] HEARING AID DEVICE

[75] Inventors: Erik Witthoefft Rasmussen, Meilen; Enrique Marcelo Blumenkrantz, Neuchatel, both of Switzerland

[73] Assignee: Phonak AG, Stafa, Switzerland

[21] Appl. No.: 635,153

[22] Filed: Apr. 23, 1996

[51] Int. Cl.$^6$ .............................. H03F 3/38; H04R 25/00
[52] U.S. Cl. .......................... 330/10; 330/251; 381/68.4
[58] Field of Search ........................... 330/10, 51, 207 A, 330/251; 381/68, 68.4, 120

[56] References Cited

U.S. PATENT DOCUMENTS

| | | | |
|---|---|---|---|
| 5,247,581 | 9/1993 | Gurcan | 381/68.4 |
| 5,389,829 | 2/1995 | Milazzo | 330/251 X |

*Primary Examiner*—Steven Mottola
*Attorney, Agent, or Firm*—Pearne, Gordon, McCoy & Granger LLP

[57] ABSTRACT

A hearing aid with a mechanical/electrical input converter and an electromechanical output transducer. The hearing aid includes a signal processing unit with an input operationally connected to the output of the input converter. The signal processing unit includes a switched output unit with a switch over control input. The signal processing unit is operationally connected to the input of the output transducer and generates an output signal switched between at least two predetermined signal levels. The signal processing unit further includes a pulse width modulator unit which generates a pulse width modulated output signal. The output of the pulse width modulator unit is operationally connected to the switch-over control input of the switched output unit. The pulse width modulator unit includes a digital control input for controlling pulse width modulation.

22 Claims, 21 Drawing Sheets

HEARING AID DEVICE

BACKGROUND OF THE INVENTION

1. Field of the Invention

The invention relates to a hearing aid device so as to improve the ability to hear. More particularly, the invention relates to improvements of such hearing aid devices.

2. Description of Prior Art

A hearing aid device has the following units:

- an input mechanical/electrical converter, as e.g. a microphone, that provides analog electrical output signals;
- a signal processing unit for processing the electrical output signal of the input converter and
- an electrical/mechanical output transdrucer, e.g. a loudspeaker, that receives the output signal of the processing unit and converts it into mechanical signals either to produce a sound signal or to directly interact with a person;
- a power supply unit which provides the electrical energy to the hearing aid device.

Hearing aid devices are known where the output transducer is operated by a switching unit generating a switched signal.

By a switched signal we understand a signal which may assume at least two signal states linked by transient edges. A switching or switched unit is a unit generating at its output such switched signals.

It is known to perform the signal processing between the input converter and a switch-over control input of the switching unit, whereat the switch-over cycles are controlled in analog technique.

It is a primary object of the present invention to provide a hearing aid device wherein the input converter is operationally connected to an input of an analog-to-digital converting unit and wherein the output of such converting unit is operationally connected to the control input of the said switching unit without implementing a digital-to-analog reconversion.

SUMMARY OF THE INVENTION

To fulfil the object mentioned above, there is provided a hearing aid with a mechanical/electrical input converter and an electromechanical output transducer; a signal processing unit with an input operationally connected to the output of the input converter, wherein the signal processing unit comprises a switched output unit with a switch-over control input and operationally connected to the input of the output transducer and generating a switched, at least two-state output signal, and further comprising a pulse width modulator unit generating a pulse width modulated output signal, the output of the pulse width modulator unit being operationally connected to the switch-over control input of the switched output unit, the pulse width modulator unit comprising a digital control input for controlling pulse width modulation.

BRIEF DESCRIPTION OF THE DRAWINGS

The invention shall be understood more clearly from the following description of exemplary embodiments of a hearing aid device, said description being made with reference to the appended drawings of which.

DETAILED DESCRIPTION

Figure 1:
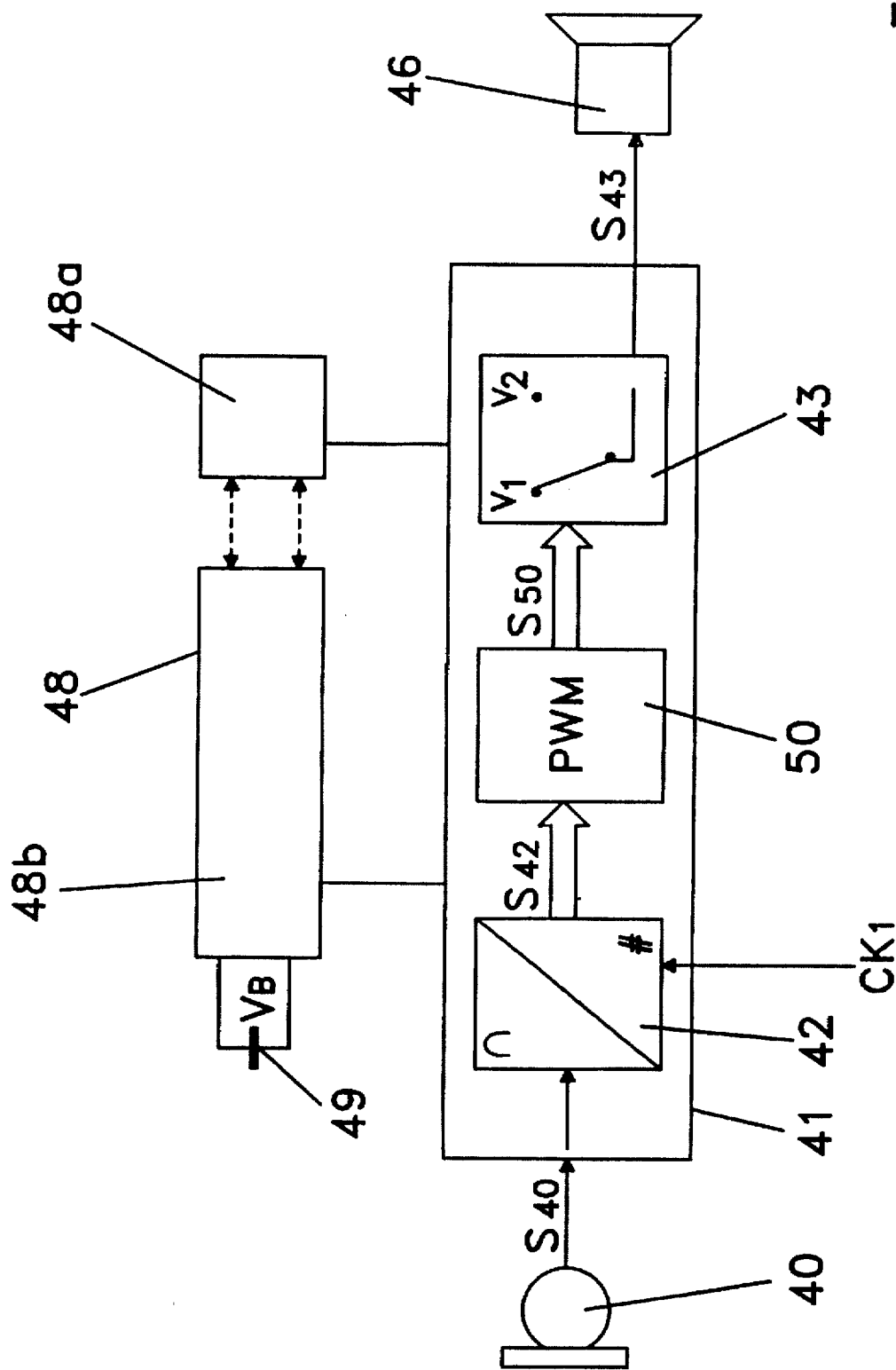
FIG. 1 is a principle block diagram of a hearing aid device according to the present invention.

FIG. 1 shows in a most generic form a functional block diagram of the hearing aid according to the present invention. The mechanical/electrical input converter 40, as e.g. a microphone, which generates an analog electrical output signal $S_{40}$, is connected to a signal processing unit 41. The output of the signal processing unit 41 drives the electromechanical output transducer 46, as e.g. a loudspeaker. The output stage of the signal processing unit 41 is formed by a switching unit 43. The signal $S_{40}$ is converted in the processing unit 41 to digital form, as shown by analog-to-digital converter unit 42 generating digital signal $S_{42}$. Signal $S_{42}$ is operationally connected to a pulse width control input of a pulse width modulator unit 50. The output signal $S_{50}$ of the pulse width modulator unit 50 is operationally connected to the switch-over control input of switching unit 43.

The output signal $S_{43}$ is switched over between at least two predetermined signal states, as shown in FIG. 1, e.g. between the two states $V_1$ and $V_2$. This output signal $S_{43}$ is operationally connected to the input of the output transducer 46 either directly or via some additional signal-shaping units.

The digital signal $S_{42}$, which is dependent from the input signal $S_{40}$, has been converted to digital form at a converting rate $CK_1$, e.g. of 20 kHz.

A power supply unit 48, powered from a battery 49, supplies, as schematically shown by unit 48a, the switching unit 43, especially for the switched states or voltages $V_1$, $V_2$, whereas another unit 48b supplies the other electronic circuitry.

Unit 48a may supply directly battery voltage $V_B$ to unit 43. It is the supply 48a of unit 43 which is of interest in connection with the present invention and not unit 48b.

Figure 2:
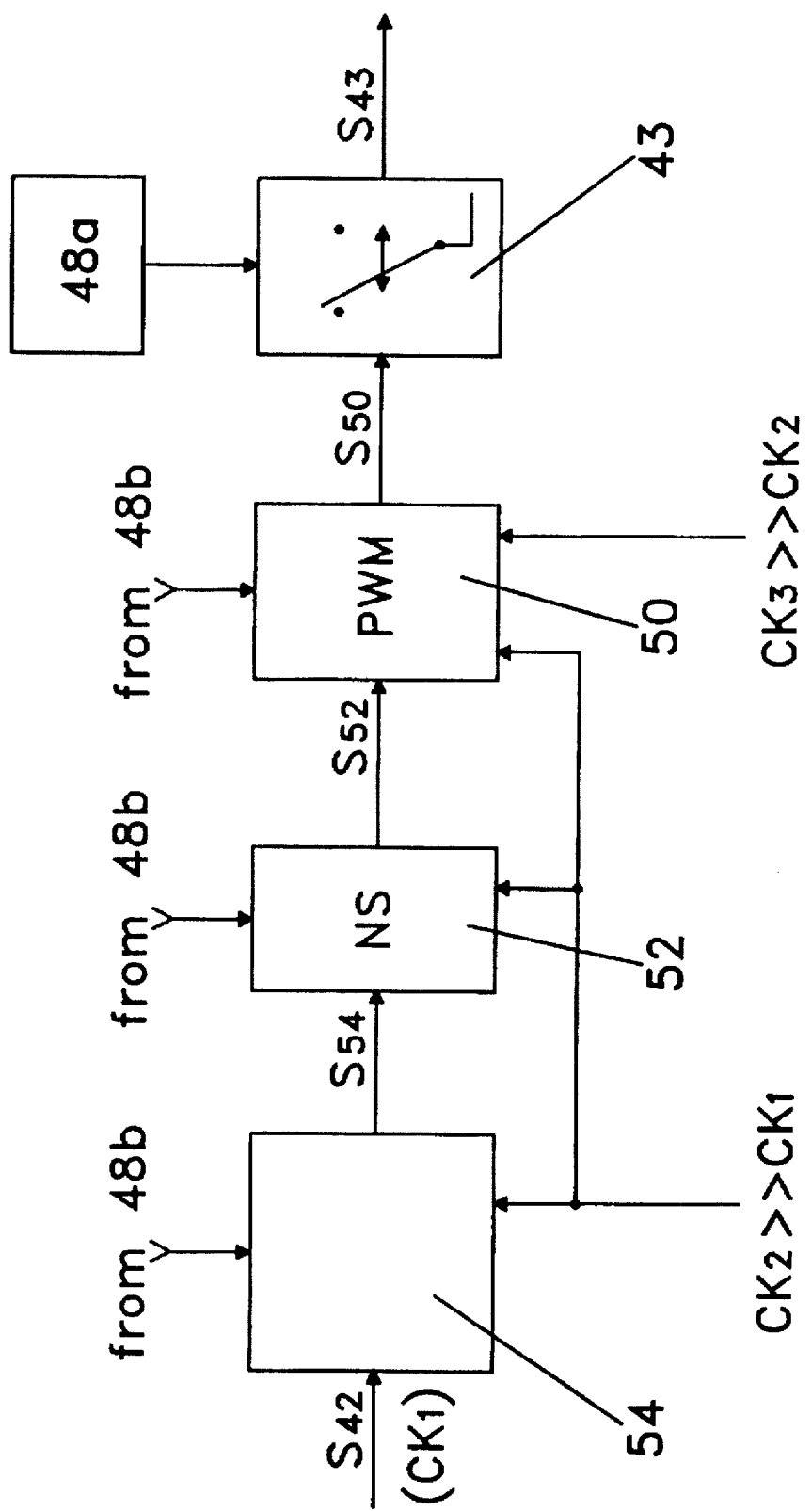
FIG. 2 is a more detailed block diagram of a hearing aid device according to the present invention in a preferred embodiment.

In FIG. 2, a more detailed signal-flow/functional block diagram of the processing units connected to the output of analog-to-digital converter 42 is shown in a preferred form of realization. The digital signal $S_{42}$ appearing with the rate $CK_1$ is input to a digital filter unit 54. The digital filter unit 54 performs oversampling and interpolation of the input digital signal $S_{42}$.

The output signal $S_{54}$ of the unit 54 is in the form of n-bit data words at the rate $CK_2>>CK_1$ as e.g. of 20 bit words at 160 kHz>>20 kHz. The digital filter unit 54 further performs an interpolation operation interpolating between subsequent $CK_1$-sampled values.

With the oversampled rate $CK_2$, the n-bit data words are fed to a noise-shaping unit 52. Therein, the n-bit input data words are converted into m-bit output data words $S_{52}$. Thereby there is valid:

n>m.

Thus, the n-bit data words of $S_{54}$ of e.g. 20 bits are converted to m-bit output data words $S_{52}$ of e.g. 5 bits appearing still at the same rate $CK_2$, e.g. of the 160 kHz.

Figure 3:
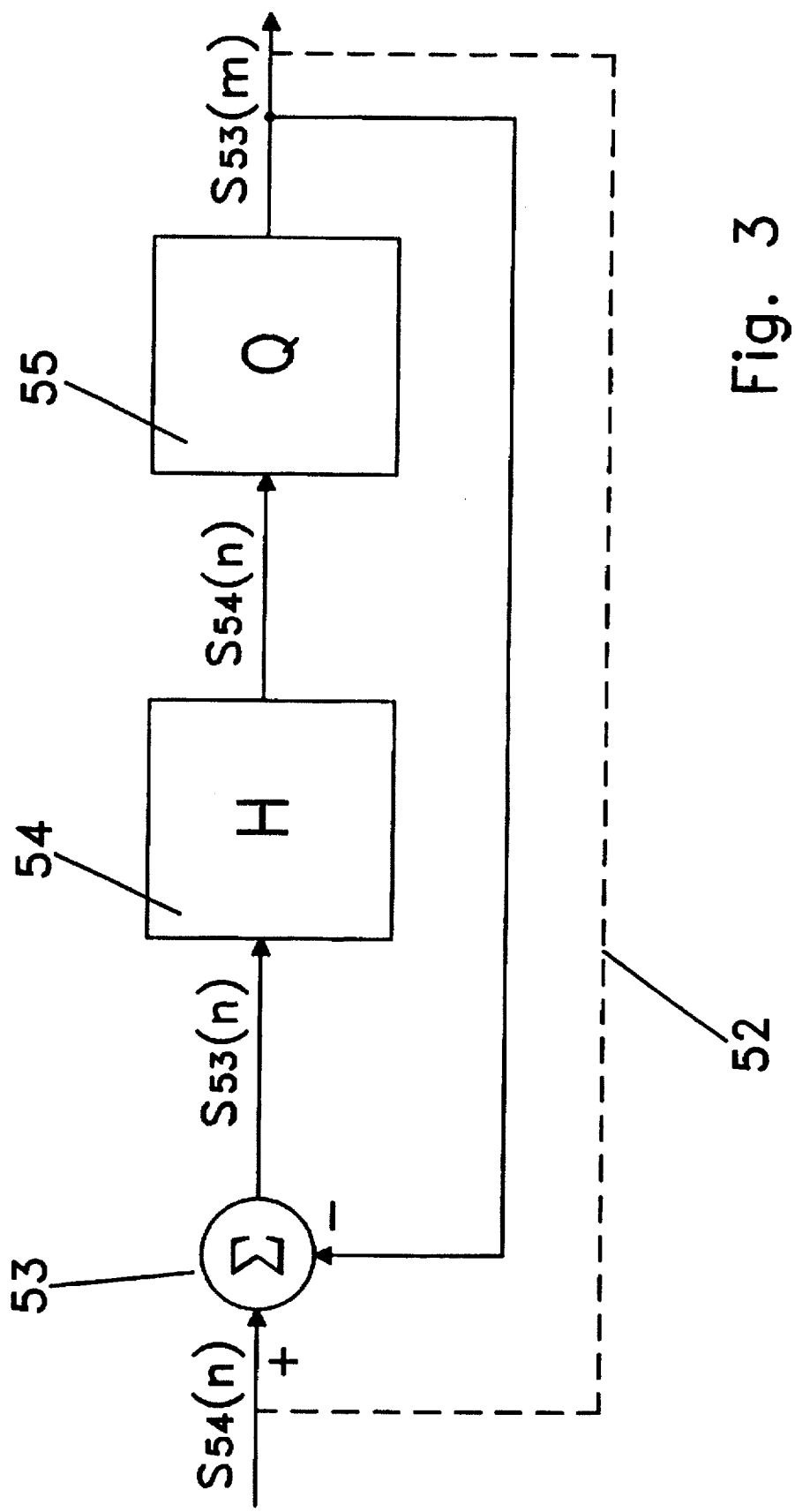
FIG. 3 is a block diagram of a noise-shaper as used in the preferred embodiment of the inventive device according to FIG. 2.

The noise-shaping as performed by unit 52 leads to shifting noise towards frequencies well above the human audio frequency band and may be realized by sigma-delta modulation as shown in FIG. 3.

One form of realization of the noise-shaping unit 52 is shown in FIG. 3. It comprises a negative feedback loop with a difference forming unit 53, one input of which receiving the signal $S_{54}$, the second input receiving the output signal $S_{52}$. The control deviation or error signal $S_{53}$ is input to a low-pass filter unit 54. The outputs $S_{54}$ of the filter unit 54 is input to a quantizer unit 55 which performs data word bit reduction and generates $S_{52}$.

According to FIG. 2, the output data words $S_{52}$ of the noise-shaping unit 52 are fed to a pulse width modulator unit PWM 50, the output signal $S_{50}$ of which being fed to the switch-over control input of the output switching unit 43.

The modulator unit 50 thus performs a conversion from digital data words $S_{52}$ being generated at $CK_2$ rate into a pulse width modulated control signal $S_{50}$ for the switching output stage 43 of FIG. 1.

Figure 4:
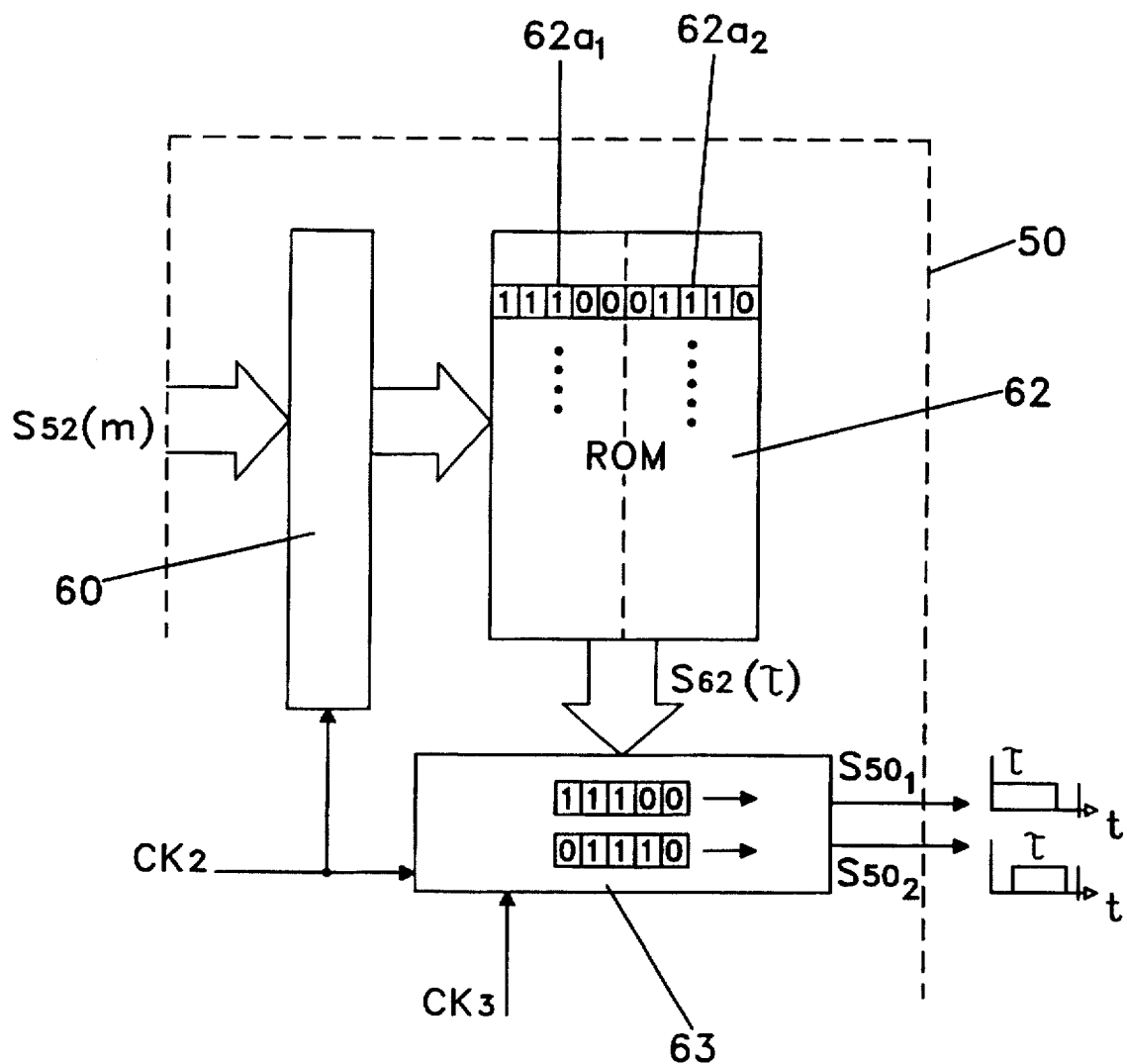
FIG. 4 shows in schematic and diagrammatic form a preferred form of realization of a pulse width modulator unit as used in the inventive device according to FIG. 2.

FIG. 4 shows a first and preferred realization form of modulator unit 50. The m-bit data words $S_{52}$ are clocked with $CK_2$ into a buffer and addressing unit 60 wherefrom these data words address a memory 62, preferably realized as a read-only memory. In memory 62, addressable data sets $62a_1$, $62a_2$ representing respective pulse width modulation patterns are stored, preferably for each address according to $S_{52}(m)$ a pair of two such data sets.

These data sets $62a_1$, $62a_2$ are clocked in parallel into register unit 63 at a rate according to $CK_2$ and are output from register 63 in series at a rate $CK_3>>CK_2$, e.g. at 10 MHz at the outputs $S50_1$ and $S50_2$. The bit number in the data sets accords to the ratio of the frequencies $CK_2$ to $CK_3$.

At the pair of data sets $62a_1$, $62a_2$, appropriate selection of '1' data bits and '0' data bits allows determination of output pulse width $\tau$ quantized by the period of $CK_3$, i.e. $P_{CK3}=CK_3^{-1}$, and with any desired mutual phasing in the respective PWM frame or pulse repetition period according to $P_{CK2}=CK_2^{-1}$.

Memory 62 acts as a conversion table emitting for each address a pair of pulse width modulation pulses of a specific length $\tau$.

Figure 5:
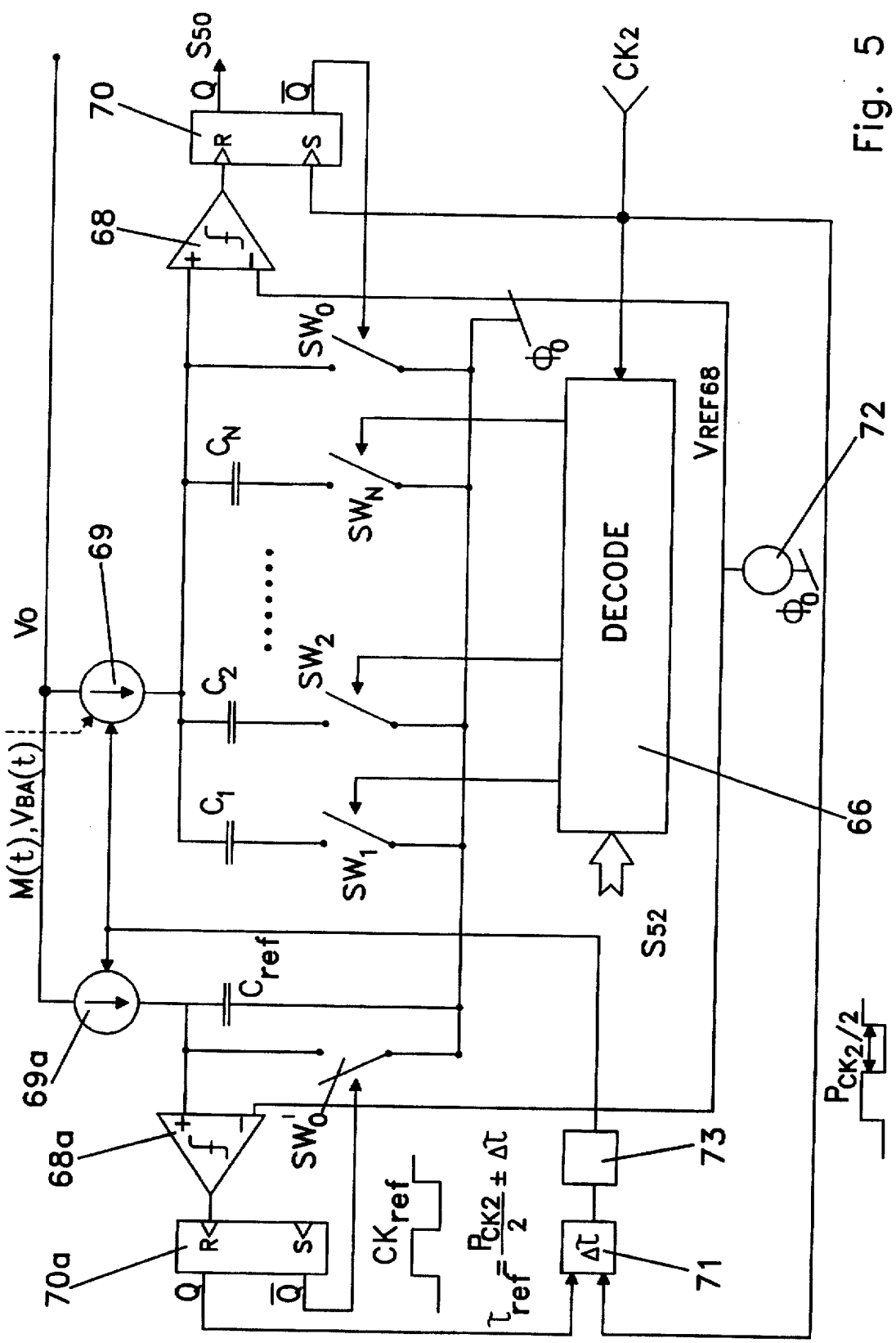
FIG. 5 shows in a simplified diagrammatic form a second mode of realization of a pulse width modulator unit as used in the inventive device according to FIG. 2.

Another form of realization of pulse width modulator unit 50 is shown in FIG. 5. Thereby, the m-bit data words $S_{52}$ are first fed into a decoder 66. A converter unit 67 comprises a number N of capacitors $C_1$ to $C_N$, e.g. having equal capacitance values. The number N of the capacitors preferably accords with the number $2^m$ wherein m is the number of bits of the data word $S_{52}$. To each capacitor there is associated a switch $SW_1$ to $SW_N$. On one side all the capacitors are commonly connected to a current source 69 supplied by the supply voltage $V_o$ of unit 48b according to FIG. 1. By means of the switches $SW_{1-N}$, the capacitors may selectively be connected in parallel to reference potential, i.e. to ground potential $\phi_o$. The data words S52(m) control via the decoding network 66 how many of the capacitors $C_1$ to $C_N$ are simultaneously connected in parallel by appropriate closing of the associated switches SW. A discharging switch $SW_o$ short-circuits those capacitors, the associated switches SW of which being closed.

A comparator unit 68 is connected to the common connection of all capacitors $C_1$ to $C_N$ and of the current source 69 and further to a reference voltage $V_{REF68}$. The output of the comparator unit 68 acts on the input R of an RS-type bistable unit 70. The clock signal $CK_2$ governs the pulse repetition frequency or cycle of the pulse width modulated signal $S_{50}$. The pulse width modulated signal $S_{50}$ is generated at the output terminal Q of the circuit 70. The complementary signal that appears at the other output terminal $\bar{Q}$ is applied to the switch $SW_o$ to control discharging of the capacitors which were just charged.

The operation of the modulator as realized according to FIG. 5 is as follows:

On the occurrence of the leading edge of the clock signal $CK_2$, decoding of a data word $S_{52}$ at unit 66 leads to closing of an according number of switches $SW_{1-N}$. Thereby, the associated capacitors become charged by the current I of the current source 69. At the same time the signal $CK_2$ has turned on the bistable unit 70 on H-state at its Q-output and to L-state at the $\overline{Q}$-output.

The selected capacitors $C_{1-N}$ are charged leading to a voltage ramp $V_c$ with a rising rate directly proportional to the current I of the current source 69 and inversely to the sum of all activated capacitors $C_{1-N}$. As soon as the value of $V_c$ reaches $V_{REF68}$, the comparator unit 68 resets unit 70 so that its output Q goes low. Thereby, $\overline{Q}$ going high closes switch $S_o$ and discharges these capacitors. The converter is now ready for the next cycle according to the next data word to decoder 66.

There results an output signal $S_{50}$ with a pulse repetition frequency according to $CK_2$ and with a pulse duration $\tau$ which is controlled by the capacitance of simultaneously parallel connected capacitors $C_1$ to $C_N$ and thus by data word $S_{52}$.

The rising rate of $V_c$ is a function of the value of current I of the current source 69, the value of resulting capacitance.

The resulting pulse width $\tau$ is additionally dependent on the value of $V_{REF68}$. The capacitors $C_{1-N}$ may be accurately matched, i.e. their mutual ratio is exact, but not their absolute values which in fact govern $\tau$.

Therefore, there is provided a second current source 69a, loading during the cycles of $CK_2$ a reference capacitor $C_{ref}$. Current source 69a is accurately matched with current source 69. The voltage $V_{cref}$ across $C_{ref}$ is led to reference comparator 68a being fed by $V_{REF68}$. $C_{ref}$ is selected so that at a rated value $I_{ref}$ of source 69a and at $V_{REF68}$, $\tau_{ref}$ should become equal to the "H" or "L" portion of the $CK_2$ pulse train, thus e.g. to $$\frac{P_{CK2}}{2}.$$

Thus, the resulting actual reference pulse length $\tau_{ref}$ is compared with $P_{CK2}$ of the clock pulse $CK_2$, at a phase detector unit 71. The output of unit 71 according to $\Delta\tau$ is led as an adjusting signal on control inputs for the matched current sources 69, 69a via an appropriate unit 73 converting $\Delta\tau$ in an adjusting signal for the respective sources. Additionally, or even instead of adjusting the matched current sources 69, 69a, voltage source 72 could be adjusted.

$C_{ref}$ is decharged via the action of flip-flop or bistable unit 70a acting in analogy to unit 70.

Thus, $\tau_{ref}$ is adjusted to become equal to $$\frac{P_{CK2}}{2}.$$

Because the current sources 69, 69a and all capacitors $C_{ref}$ and $C_{1-N}$ are matched, the pulse lengths $\tau$ become thus automatically calibrated as if the absolute values of I, $C_{1-N}$ and $V_{REF68}$ were exactly predetermined and constant.

If, with the arrangement according to FIG. 5 and according to FIG. 4, two signals $S50_1$, $S50_2$ are to be generated with selectable phasing of their impulses $\tau$, then preferably the arrangement according to FIG. 5 is provided twice, one for $S50_1$, one for $S50_2$, and the two decoders 66 initiate pulse generation with a preselectable mutual delay (not shown).

The generic concept as it was explained with the help of FIG. 5 varies, according to the information in the digital words $S_{52}$, merely the value of a charged capacitance. It is clear to the skilled artisan that instead of varying or controlling the value of capacitance, charged by a constant current, and comparing the resulting voltage ramp $V_c$ with a constant reference voltage, one could alternatively or additionally vary the current value which is used for charging the capacitive network and/or the reference voltage $V_{REF68}$.

Thus, according to a generalized approach for realizing a modulator 50 by the technology as shown in FIG. 5, as a function of the digital words $S_{52}$, pulse width modulation may be realized by varying at least one of a capacitance charging current, the value of a capacitance being charged, a reference voltage with which the voltage ramp resulting from capacitance charging is compared.

Figure 6:
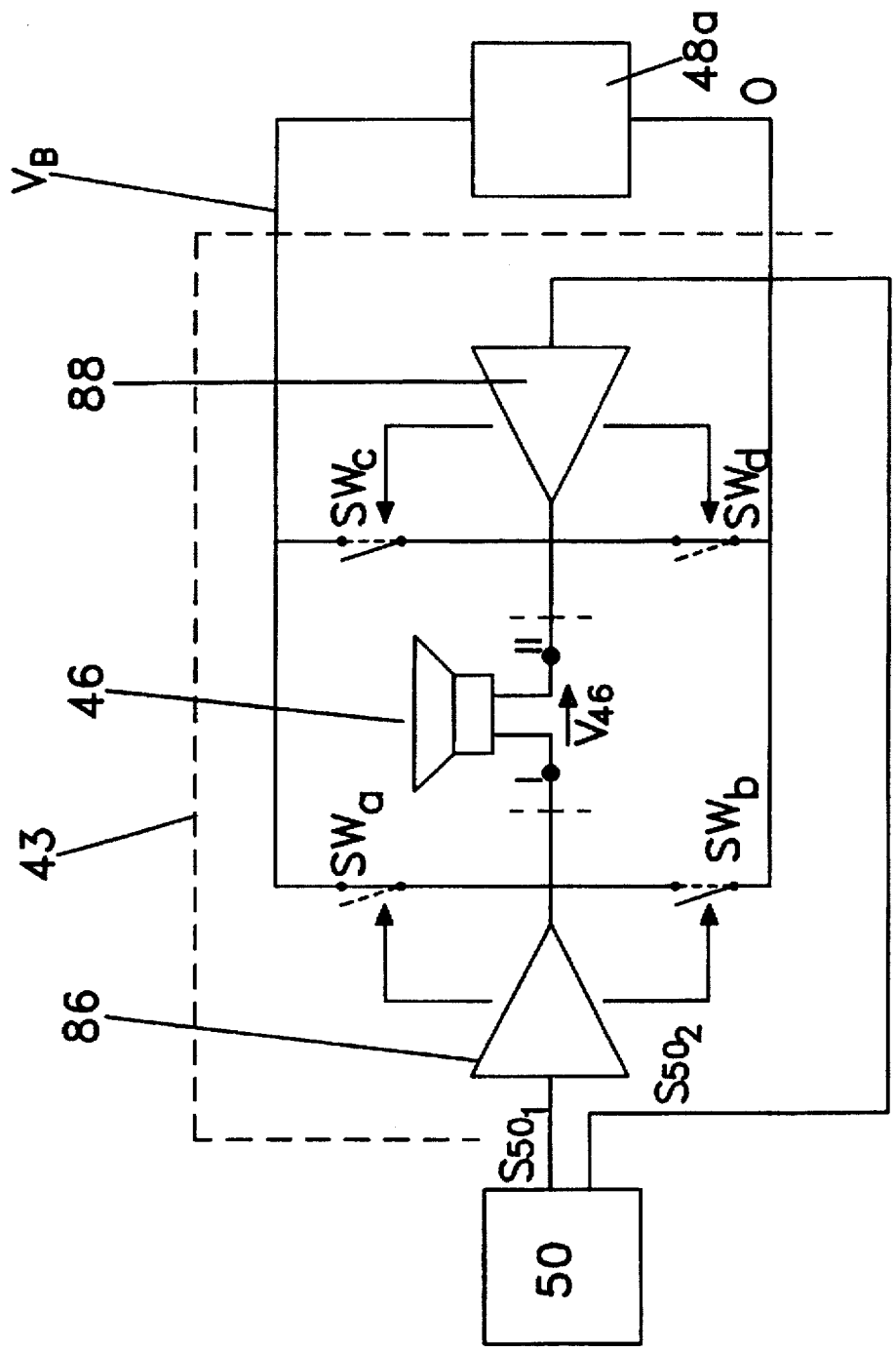
FIG. 6 shows in a simplified diagrammatic representation a preferred realization form of a switched output unit of the inventive device according to FIG. 2 connected to a loudspeaker as output transducer.

In FIG. 6, there is shown a preferred form of realization of the inventive switched output stage 43 according to FIG. 1.

The signals $S50_1$, $S50_2$ from the pulse width modulator unit 50 are led as switch-over control signals to a driver unit, comprising two drivers 86 and 88. They drive four switches $SW_a$ to $SW_d$ which are connected to the output transducer 46 as a bridge. The bridge of switches $SW_a$ to $SW_d$ is fed by the voltage $V_B$ derived from battery 49 of FIG. 1 via supply unit 48a, preferably directly by the battery voltage. The activated drivers 86 and 88 close $SW_a$ and $SW_d$ or $SW_b$ and $SW_c$ so that a voltage $V_{46}$ appears between the input terminals I and II of the output transducer 46 which is switched between + and $-V_B$ in a rhythm controlled by the pulse width modulated signals $S50_1$, $S50_2$. Whenever both drivers are deactivated, $SW_a$ and $SW_c$ are closed, thus the inputs of transducer 46 short-circuited, whereby $SW_b$ and $SW_d$ are open, disconnecting $V_B$ from the load.

If the series inductance of the output transducer 46 is high enough, then the output transducer 46 may be connected, as shown in FIG. 6, directly to the output of the switched output stage. This is normally the case for loudspeakers as used for hearing aids. Nevertheless, if this is not the case, in order to dampen the high frequency noise, a passive filter may be added between the output of the switched output unit 43 and/or an external inductance may be provided between at least one of the input terminals of the output transducer 46 and one of the outputs of the switched output unit 43.

Figure 7:
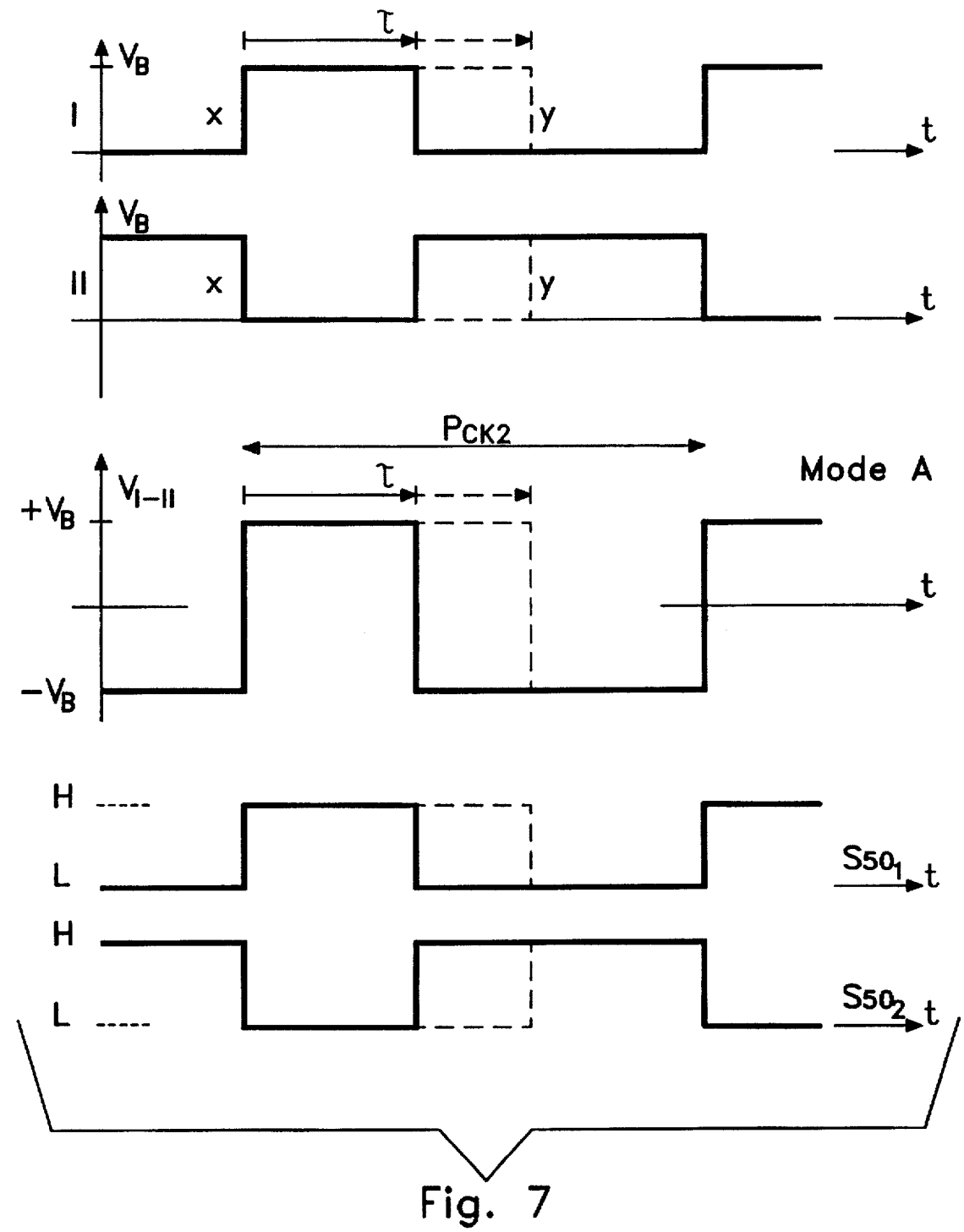
FIG. 7 shows the time course of potentials applied to the inputs of the transducer according to FIG. 6 and of the resulting voltage between such inputs and of the pulse width modulated control signals applied to the control input of the switched output unit according to FIG. 6 in a first mode A operation.

In FIG. 7 there are shown the time diagrams of the electric potentials applied to the terminals I and II of the output transducer 46 in the embodiment of the switched output unit 43 as it is schematically shown in FIG. 6 and according to a first mode A of phasing $S50_1$ and $S50_2$. Further, there is shown in FIG. 7 the resulting voltage $V_{I-II}$ between the terminals I–II. In mode A, the two terminals I and II are complementarily connected to $+V_B$, 0.

Figure 8:
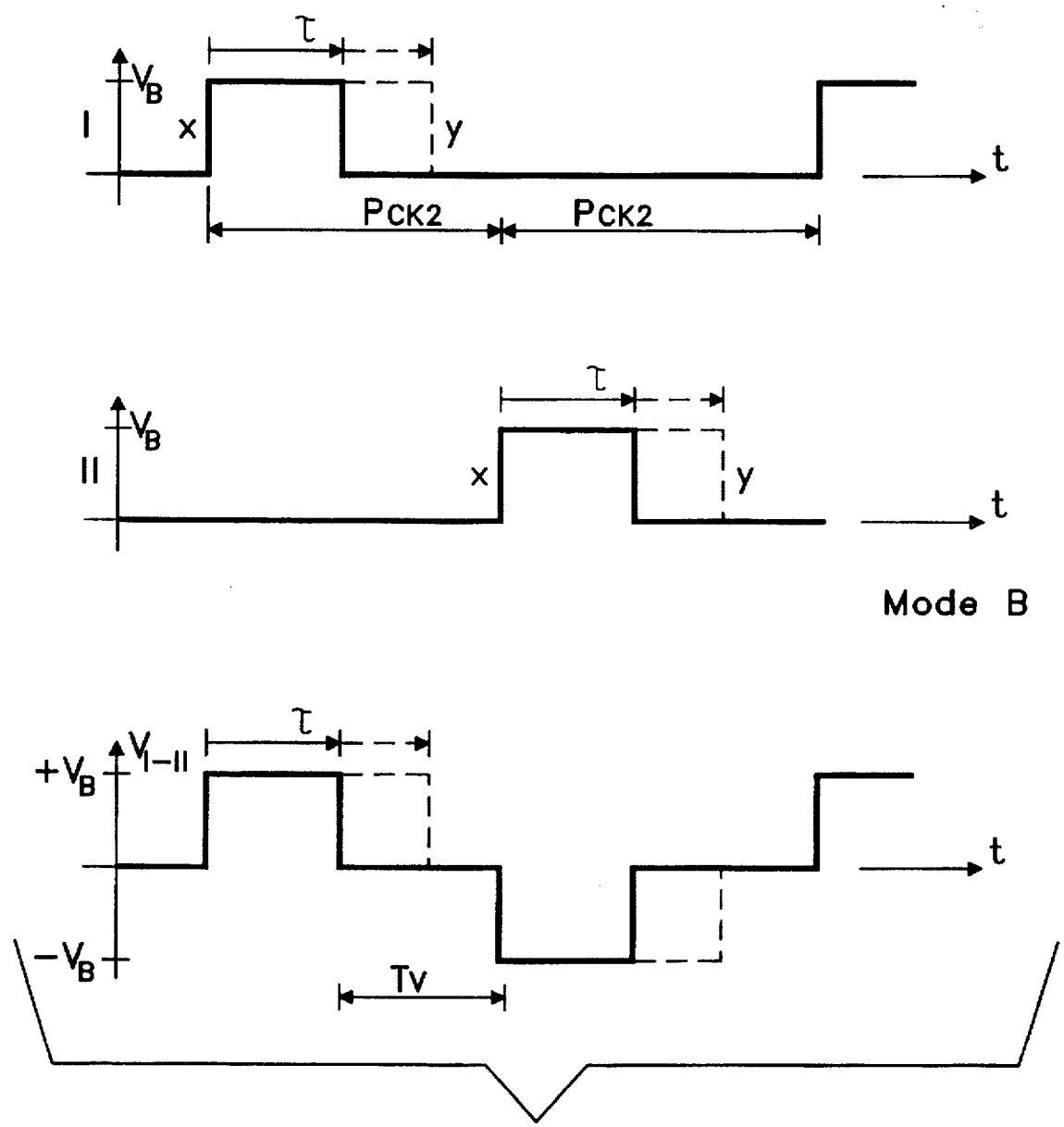
FIG. 8 shows over time axis the potential courses and the resulting voltage course at the inputs of the transducer according to FIG. 6 as operated in a second operation mode B.

A mode B of realizing the output signal of the output switching unit 43 is shown in FIG. 8. Thereby, according to the signal of $S_{52}$, a I- or a II-cycle is made. During intermediate time intervals, the respective transducer inputs I, II are short-circuited and $V_B$ is disconnected from transducer 46.

Figure 9:
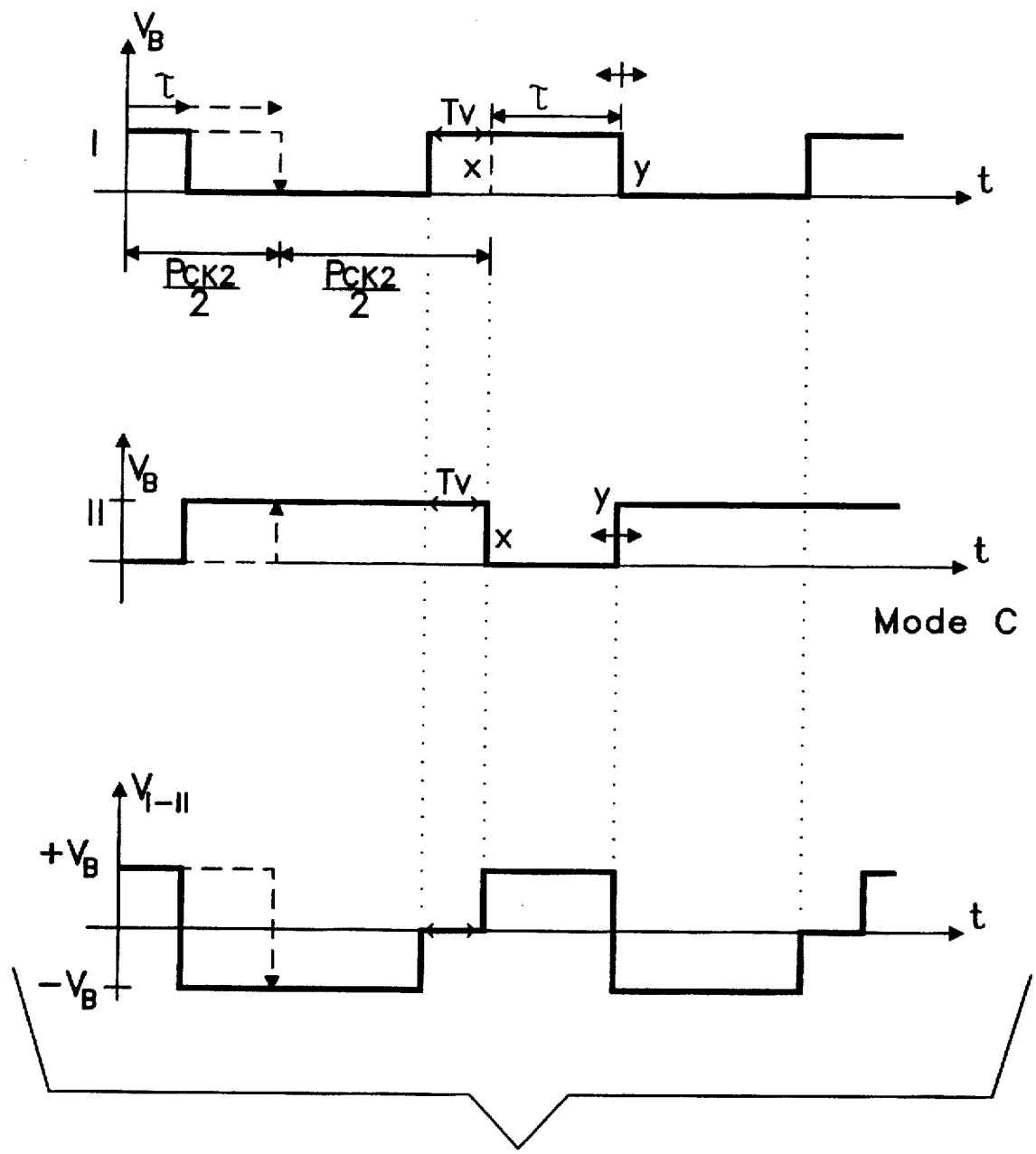
FIG. 9 shows in a representation in analogy to FIGS. 7 and 8 operation in a third C mode.

For low signal levels, mode C, according to FIG. 9, may be used. During a fixed time span $T_V$ of $P_{CK2}$, the load according to the transducer 46 of FIG. 6 is short-circuited. During the remaining time span of $P_{CK2}$, this mode accords with mode A.

In FIG. 9, $T_V$ is shown rather short, but can be extended e.g. up to $P_{CK2}/2$.

Comparing the three modes A to C leads to:

mode A: $V_{I-II}$ has a considerable energy at the carrier frequency $CK_2$.

mode B: $V_{I-II}$ has practically no energy at the carrier frequency $CK_2$.

mode C: $V_{I-II}$ has an energy at the carrier frequency $CK_2$ which is significantly lower than in mode A and which decreases together with transmitted signal power ($\tau$).

Straightforward PWM control will lead to a phasing of the PWM impulses of $S_{50}$ as is shown in the FIGS. 7 to 9. Thereby, lengthening or shortening of the pulse width $\tau$ is asymmetric in that the phasing of leading edge X of the respective impulses is constant with respect to $P_{CK2}$. The phasing of the lagging pulse edge Y is varied according to variation of $\tau$. This leads to the disadvantage that there appears at the voltage $V_{I-II}$, applied to the output transducer 46, significant distortion product signals.

Figure 10:
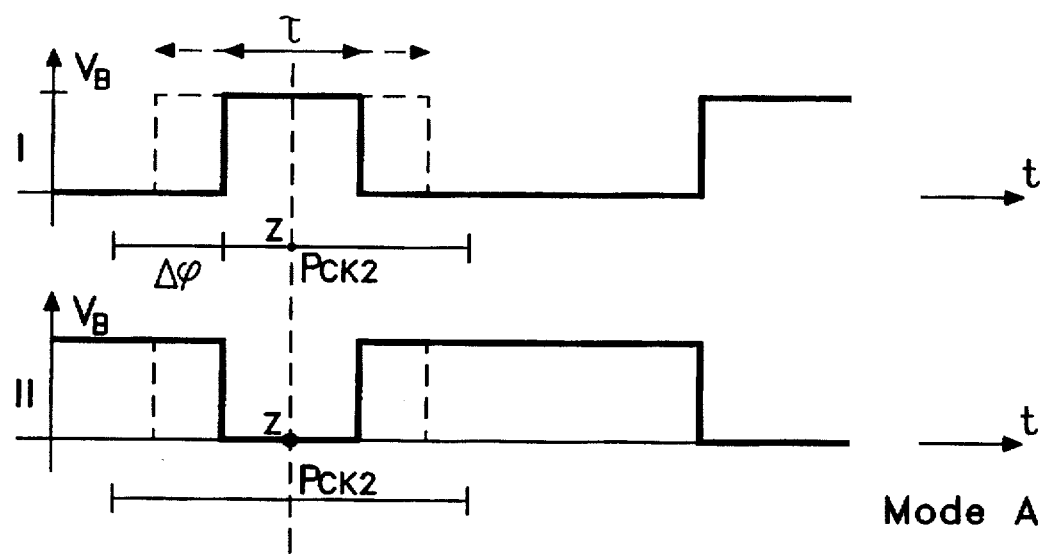
FIG. 10 shows in a representation according to the FIGS. 7 to 9 mode A operation with symmetric pulse width modulation.
Figure 10:
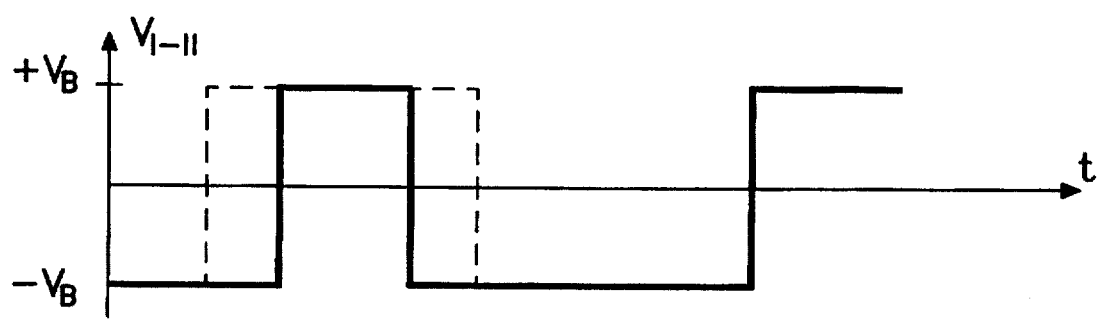
Figure 10:
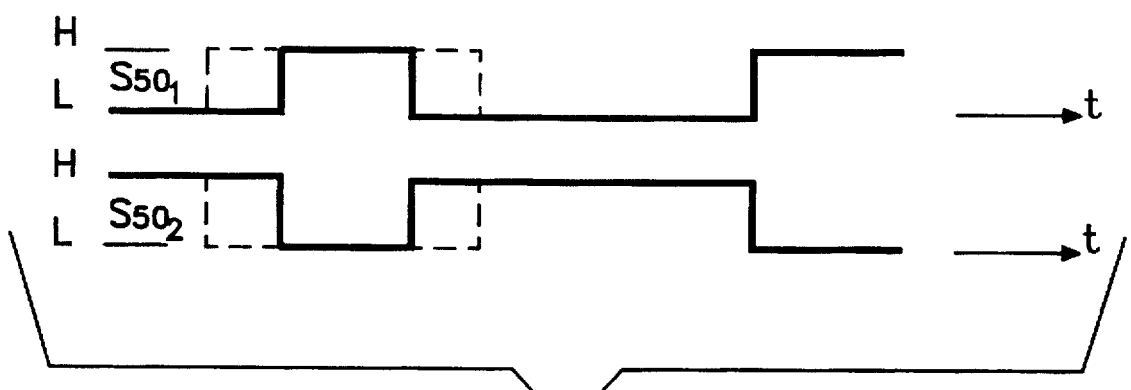
Figure 11:
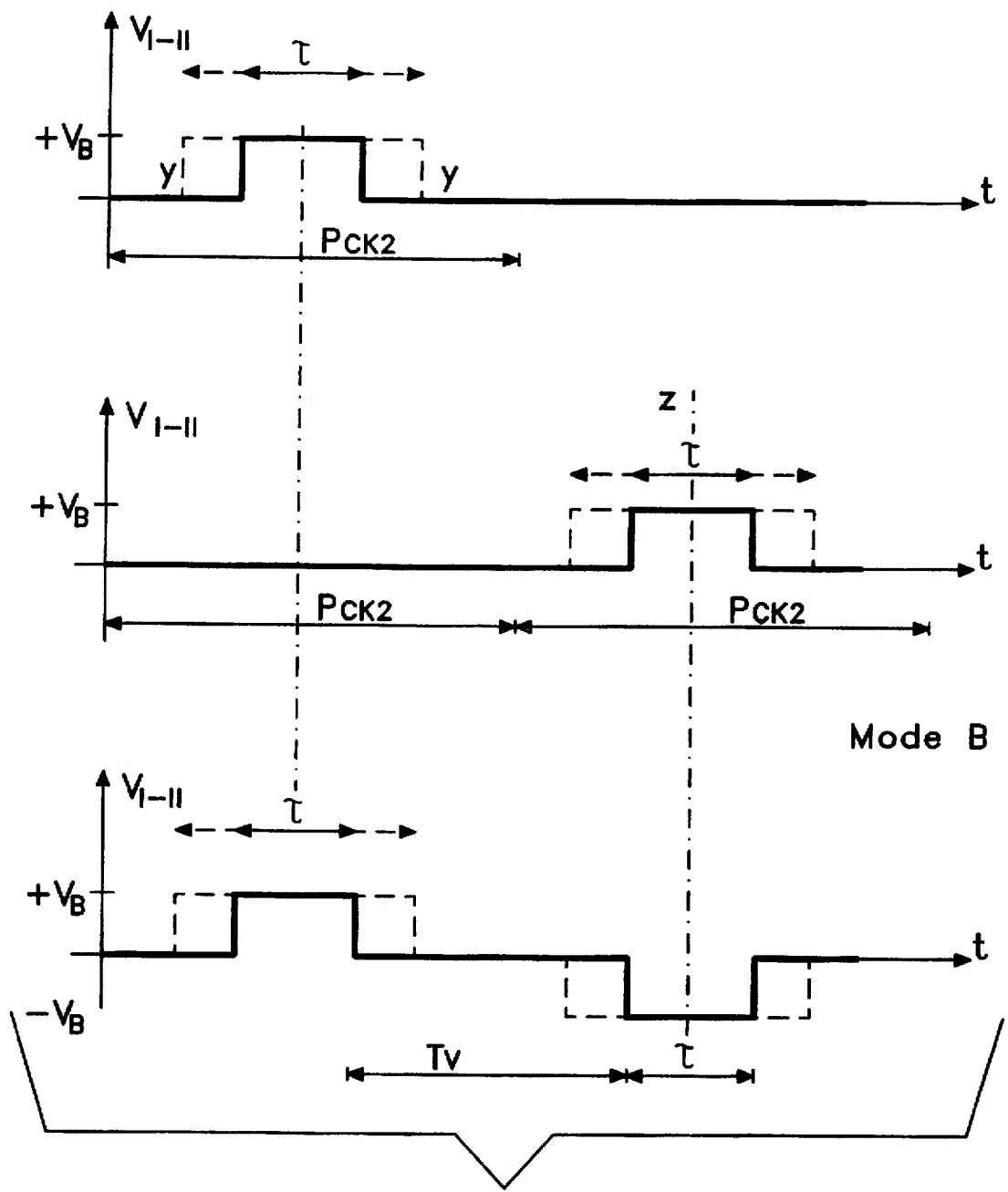
FIG. 11 shows in a representation according to FIG. 10 symmetric modulation in mode B.
Figure 12:
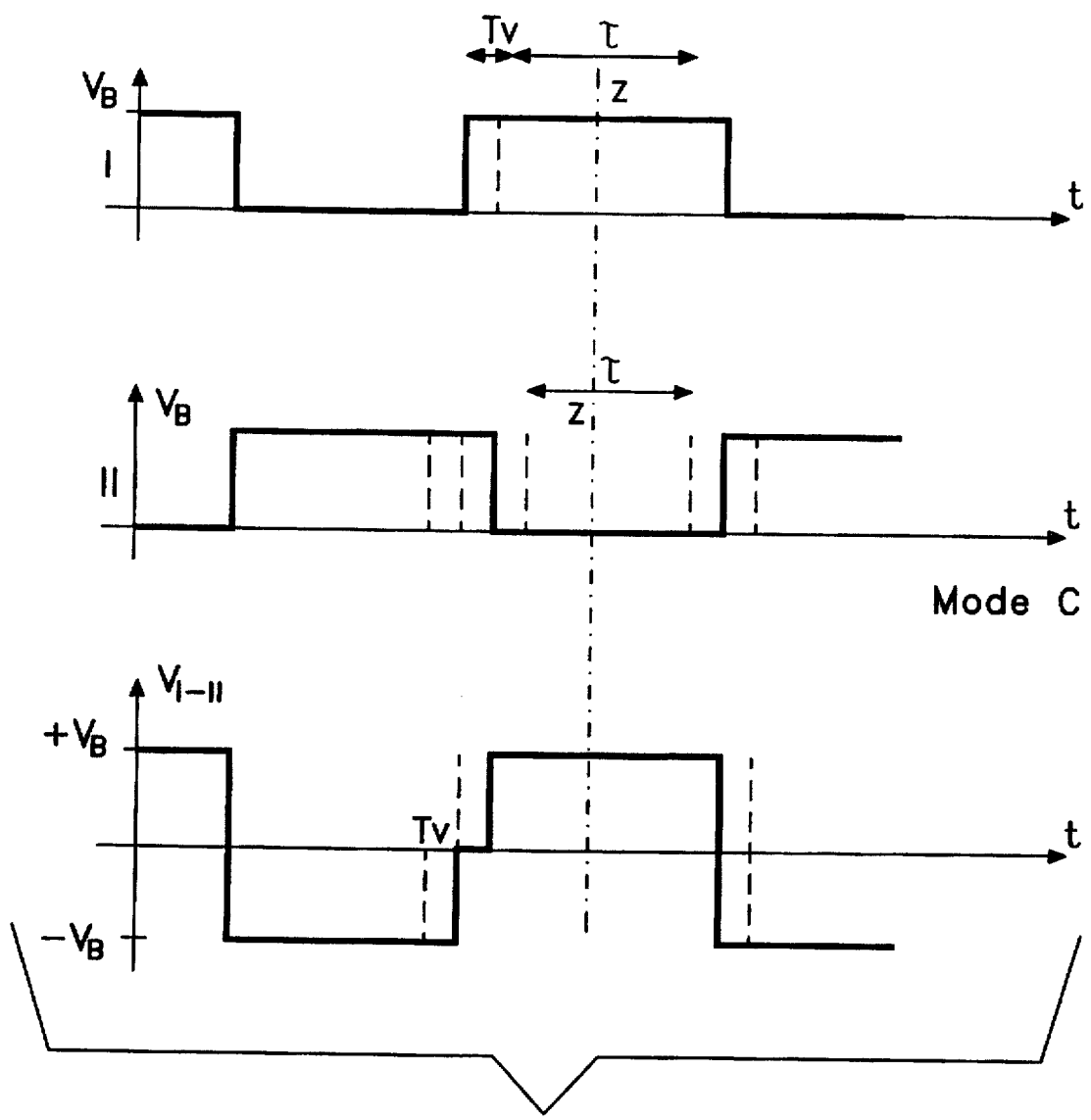
FIG. 12 shows in a representation according to FIG. 11 symmetric pulse width modulation in mode C.

Therefore, departing from the realizations according to FIGS. 7, 8 or 9, a further improvement is reached by symmetrically varying the modulated pulse length $\tau$ as shown in FIGS. 10, 11 and 12 for the modes A, B, C respectively. Here, pulse width $\tau$ variations are realized symmetrically to a fixed phasing of PWM pulse centre Z.

The pulse width modulated control signals $S50_1$ and $S50_2$ are in fact shaped as the signal courses I, II of the FIGS. 10 to 12 respectively.

In the preferred mode of realizing the pulse width modulator unit 50, according to FIG. 4, symmetric modulation is done by appropriately setting the pulse pattern in the data sets $62a_1$ and $62a_2$, which respectively represent the signal course serially emitted from the register 63. In the form of realization according to FIG. 5, this is realized by appropriately delaying the start of voltage ramps $V_C$ with respect to the time frame given by $CK_2$. As was mentioned above, generation of $S50_1$ and $S50_2$ with the embodiment according to FIG. 5 is realized by doubling such embodiment and appropriately determining the phase shift of one output signal of one embodiment, let us say $S50_2$, from the output signal generated by the second embodiment, $S50_1$.

By this symmetrical modulation, a significant reduction of distortion product signals in $V_{I-II}$ is reached.

All considerations up to now have been made under the assumption that the battery voltage $V_B$ or, more generally, the voltage of power supply 48a according to FIG. 1 is constant and precise. Obviously, this does not hold. If we consider e.g. FIGS. 7 to 12, it becomes clear that the actual battery voltage $V_B$, now named $V_{Ba}(t)$, directly influences the voltage $V_{I-II}$ at the output of the output switching unit 43. Thereby, it is clear that any deviation of the battery voltage $V_{Ba}(t)$ will influence the output audio signal. For the actual "a" state we may write, with $S_{50}$ representing the effect of $S50_1$, $S50_2$, $$V_{I-IIa}(t)=S_{50}(t)\cdot V_{Ba}(t),$$

wherein $V_{I-IIa}(t)$ denotes the voltage applied to the terminals of the output transducer 46 varying in time due to variations of the actual battery voltage $V_{Ba}(t)$.

We may further write for the desired "d" value of voltage applied to the output transducer 46:

$$V_{I-IId}(t)=S_{50}(t)\cdot V_{Bd},$$

which is only time varying due to pulse width modulation.

Therefrom there follows:

$$\frac{V_{I-IIa}(t)}{V_{I-IId}(t)} = \frac{V_{Ba}(t)}{V_{Bd}} = M(t).$$

Thus, we receive:

$$V_{I-IId}(t) = S_{50}(t)\cdot M^{-1}(t) \cdot V_{Ba}(t)$$
$$= [M^{-1}(t)\cdot S_{50}(t)]V_{Ba}(t).$$

Thus, in a further improvement of the present invention, the ratio of actual battery voltage $V_{Ba}(t)$ to a reference desired battery voltage $V_{Bd}$ is monitored and the signal received from the input converter 40 up to being applied to the control input of output stage 43 is multiplied by the time varying factor $M^{-1}(t)$ or is divided by the time varying factor $M(t)$.

Figure 13:
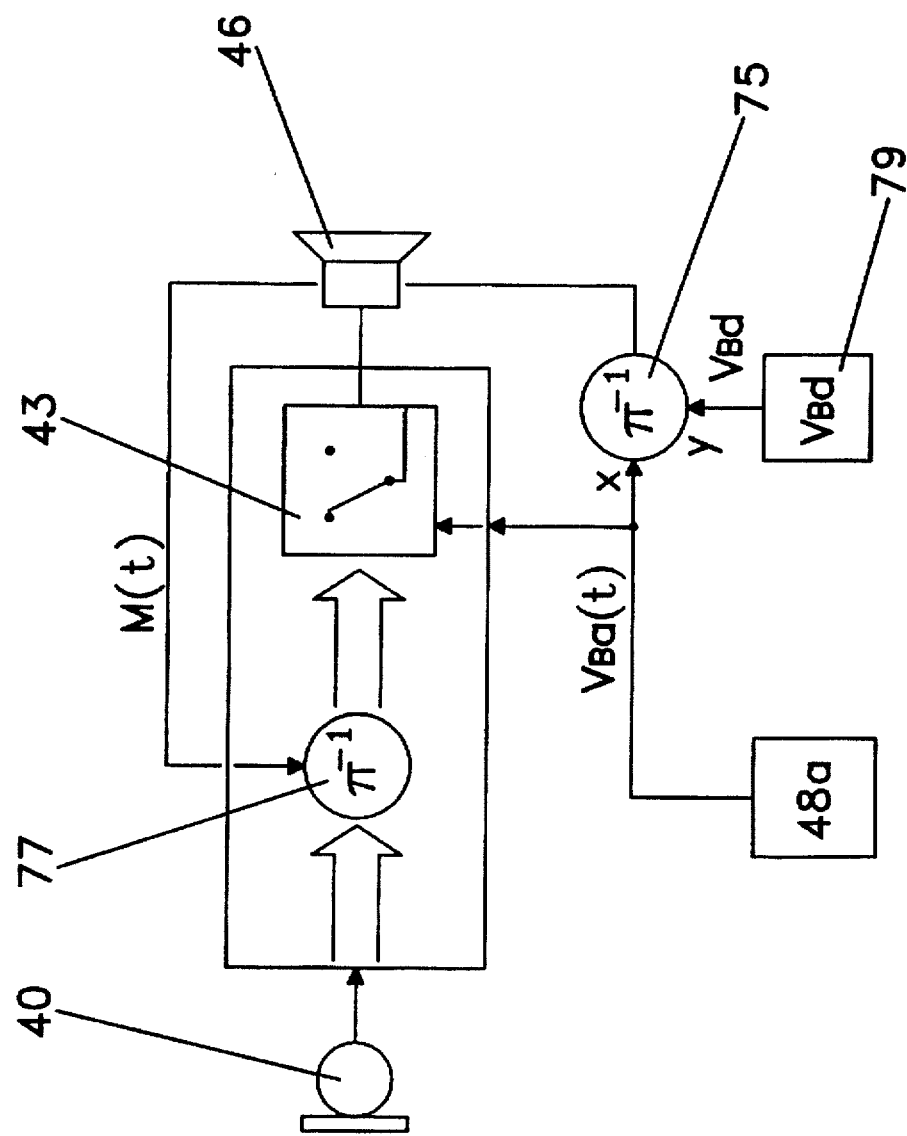
FIG. 13 shows in a generalized functional block signal flow diagram an improvement at the inventive device for compensating power supply variation.

The principle of this improvement is shown in FIG. 13 in a generic representation of the invention according to FIG. 1.

According to FIG. 13, the output voltage $V_{Ba}(t)$ of the supply unit 48a or a voltage proportional thereto is led to a division unit 75 where the input x is divided by the input y or vice-versa. The quotion x/y accords with $M(t)$.

In the signal processing path between the input converter 40 and the switch-over control input to the switched output unit 43 there is provided a division unit 77 wherein the signal processed between the output of the input converter 40 and the said control input is divided by $M(t)$. If the division unit 75 performs the division y/x, thus resulting in $M^{-1}(t)$, then and preferably the unit 77 is a multiplication unit. The reference voltage source 79 is realized by stabilizing a part of the voltage $V_{Ba}(t)$ of voltage supply 48a.

As is obvious, the units 77 and 75 may be realized in digital, analog or hybrid technique according to the signals to be processed.

Figure 14:
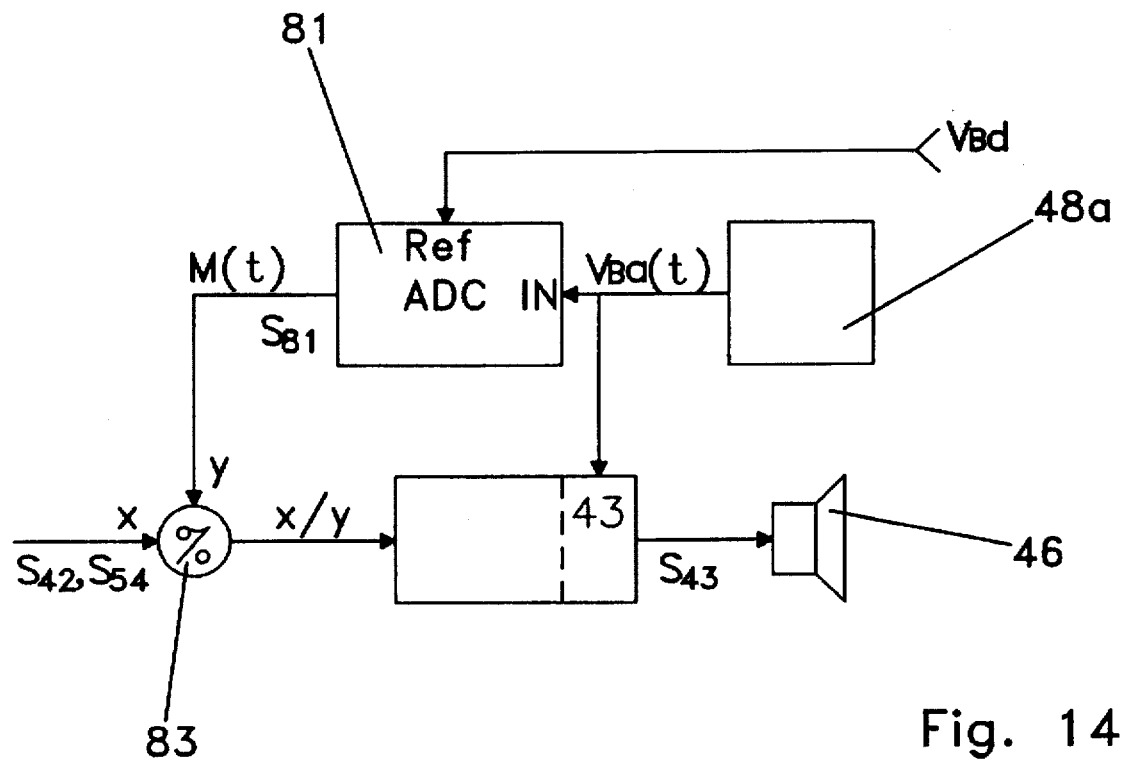
FIG. 14 shows a first preferred realization form of the technique according to FIG. 13.

A preferred mode of realization of this battery voltage compensating technique is shown in FIG. 14. The reference voltage $V_{Bd}$ is led to the reference input Ref of an analog-to-digital converter ADC 81, the input IN of which being fed by $V_{Ba}(t)$. By inherent function of an ADC, the signal at "IN" is divided by the signal at "Ref".

The output of ADC 81 is thus $M(t)$. In the digital division unit 83, the digitalized signal, preferably $S_{42}$ or $S_{54}$ according to FIG. 2, is divided by the digital value $M(t)$. The advantage of this procedure is that the dynamic range of the stages following the division unit 83, i.e. at least noise-shaping unit 52 and the modulator 50, is not affected. The correction unit realized by division unit 83 is placed anywhere in the signal path at the input-side or within the noise-shaping unit 52, whereby it is obvious that the sampling rate at the output of ADC 81 must be adapted to the sampling rate of digital signal at the input x of the unit 83.

In general, a digital multiplication may be performed faster than the more power consuming digital division. By inversing the inputs to the reference input "Ref" and to the signal input "IN" to the ADC 81 with respect to $V_{Bd}$ and $V_{Ba}(t)$, the signal $M^{-1}(t)$ appears at the output of ADC 81, so that, instead of a division unit 83, there is provided a multiplication unit at 83.

Figure 15:
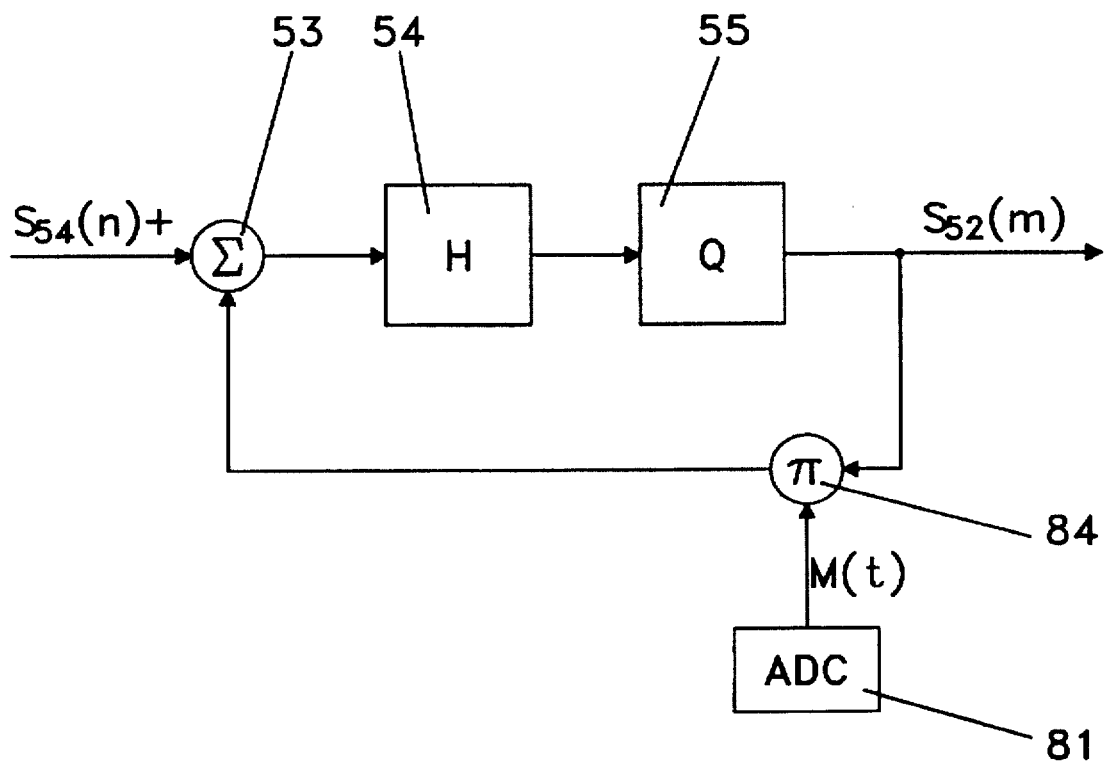
FIG. 15 shows a second realization form of a technique according to FIG. 13 at a noise-shaper according to FIG. 3.

In FIG. 15 there is shown a preferred embodiment where compensation of the varying power supply voltage $V_{Ba}(t)$ is performed in the noise-shaping unit 52. According to FIG. 3, the output of the quantizer 55 of the noise-shaping unit 52 is fed back to the difference forming unit 53. The low frequencies of the input signal $S_{54}$ are fed back, thereby eliminating low frequency noise.

According to FIG. 15, there is inserted in the feedback loop of the noise-shaping unit 52 a multiplier 84 acting on the input of difference forming unit 53. As the feedback signal is now multiplied by the factor M(t), the low frequency content of the output signal $S_{52}(m)$ is divided by the factor M(t). The digital value of M(t) is thereby formed by means of an analog-to-digital converter 81 as it was explained in context with FIG. 14.

Figure 16:
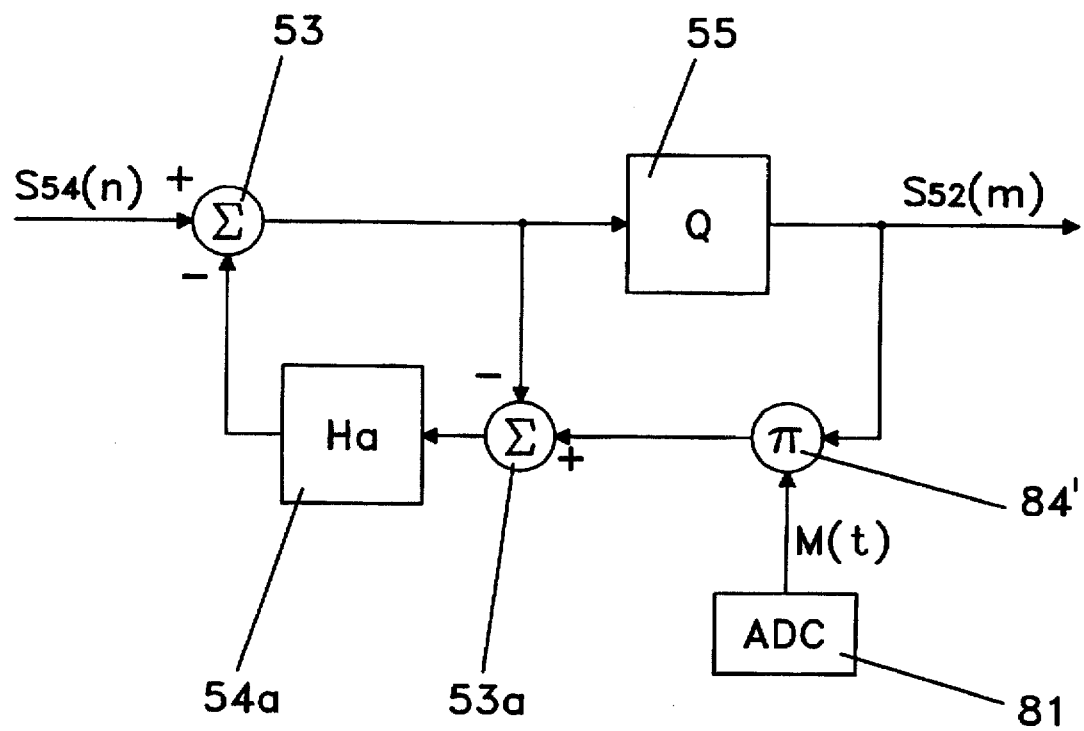
FIG. 16 shows for a second realization form of a noise-shaper unit as used in the inventive device according to FIG. 2 a further realization form of the technique according to FIG. 13.

In FIG. 16 a further topology of a noise-shaping unit 52 is shown. It comprises quantizer unit 55, difference forming unit 53 and low-pass filter unit 54a. Additionally, a multiplication unit 84' for multiplying the output signal $S_{52}(m)$ by the factor of M(t) is provided.

A further possibility to compensate for variations of the power supply voltage $V_{Ba}(t)$ is based on the following considerations:

The energy of the pulses of the pulse width modulated signal applied to the input terminals of the output transducer 46 is given by the product of the switched level $V_{Ba}(t)$ and the pulse widths τ.

Therefrom it might be seen that the effect of varying $V_{Ba}(t)$ on the energy of the signal applied to the input terminals of transducer 46 may be compensated by varying the impulse length τ. Thus, if the respective pulse lengths τ are multiplied by $M^{-1}(t)$, then the resulting switched voltage to the input terminals of the output transducer 46 will be compensated with respect to variations of the voltage $V_{Ba}(t)$.

Looking back on the embodiment of the modulator unit 50 according to FIG. 5, it was explained that the resulting pulse width τ is inversely proportional to the value of current I. The larger I is, the shorter will be the respective pulse length τ. Thus, and as introduced in FIG. 5 by dashed lines, compensation for variations of the supply voltage $V_{Ba}(t)$ may be realized by directly controlling the current source 69 by the factor of M(t).

Nevertheless, the factor M(t) is in fact directly proportional to the actual supply voltage $V_{Ba}(t)$, so that, instead of the factor M(t) as shown in FIG. 5, the voltage $V_{Ba}(t)$, as measured e.g. directly at the output of the power supply 48a, may preferably directly be used as control signal for current source 69.

For the voltage compensation technique which was explained up to now, it is necessary to tap-off the actual output voltage $V_{Ba}(t)$ of the power supply unit 48a. In operation, the power supply 48a is loaded with high frequency noise. This may adversely affect the correct operation of the described power supply voltage compensation technique.

As was explained in connection with FIG. 6, the output transducer 46 is short-circuited and any load is disconnected from voltage $V_{Ba}(t)$ when both of the signals $S50_1$, $S50_2$ are desactivated, i.e. at both of the signals no impulse is present.

Therefore, and according to the FIGS. 8 to 12, it is only during such cycle times $T_V$ that the actual supply voltage $V_{Ba}(t)$ is sampled and held for the compensation technique which was explained with the help of FIGS. 13 to 16.

The signal processing according to FIG. 1 converts an input analog signal into a digital signal which is further transformed into a pulse width modulated signal at high-power level and with high efficiency. Thereby, the quality of the audio output signal is influenced by noise on the power supply 48a, mismatches and non-linearities in the switched output stage 43 etc.

This may considerably be improved by providing a feedback technique with a reference digital-to-analog converter as will be explained with the help of FIG. 17.

Figure 17:
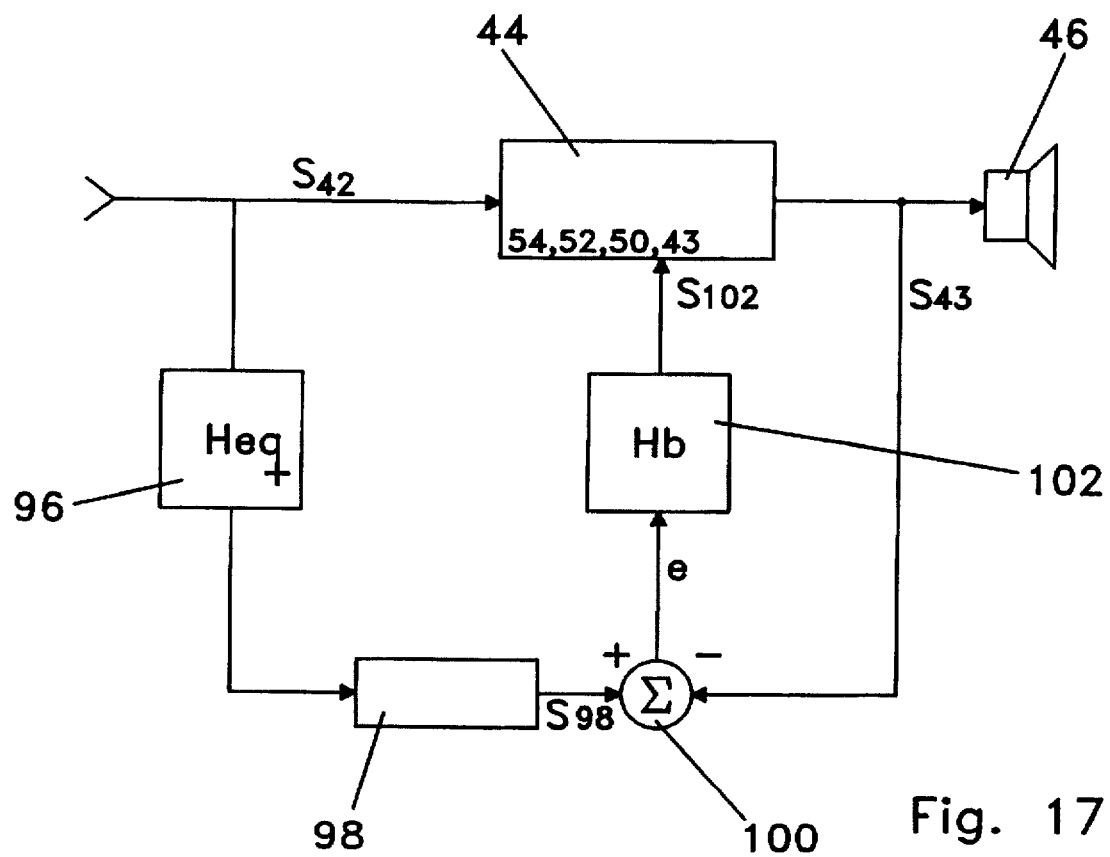
FIG. 17 shows in a functional block diagram a further improvement at the inventive device according to FIG. 2, wherein high-power signal processing is modelled by low-power signal processing, and high-power signal processing is adjusted according to the difference of modelling and high-power signal processing.

According to FIG. 17, the digitalized input audio signal $S_{42}$ is fed via a filter unit 96 onto the input of a reference signal processing unit 98 which processes the filtered input signal the same way as the processing units 54, 52, 50, 43. The difference between reference processing unit 98 and processing units 54, 52, 50, 43 is that the reference processing unit 98 operates on low-power signals and may thus be realized for very high quality. Thus, unit 98 is in fact a low-power model of units 54, 52, 50, 43. It is well known that for low-power levels without signal amplification as is done in signal processing units 54, 52, 50, 43, it is possible to make high quality voltage or current audio digital-to-analog conversion.

The reference processing unit 98 generates the output signal $S_{98}$ which is compared at the difference forming unit 100 with the actual signal $S_{43}$ which is applied from the switched output unit 43 onto output transducer 46. The control deviation or error signal "e" at the output $S_{100}$ of the difference forming unit 100 is amplified and filtered in the loop filter unit 102 and applied as an adjusting signal $S_{102}$ to adjust the processing line 54, 52, 50, 43, denoted by 44, in such a way that the output signal $S_{43}$ becomes equally shaped as the low-power signal $S_{98}$. Signal $S_{98}$, in fact, represents the signal shape on low-power level which would be desired also, on the high-power level of $S_{43}$. The filter unit 96 equalizes phase and frequency response of $S_{98}$ with respect to $S_{43}$. The error signal e will only contain noise and non-linear distortion components and will act on processing line 44 to cancel such error signal to practically vanish according to the open-loop gain of the negative feedback loop.

Figure 18:
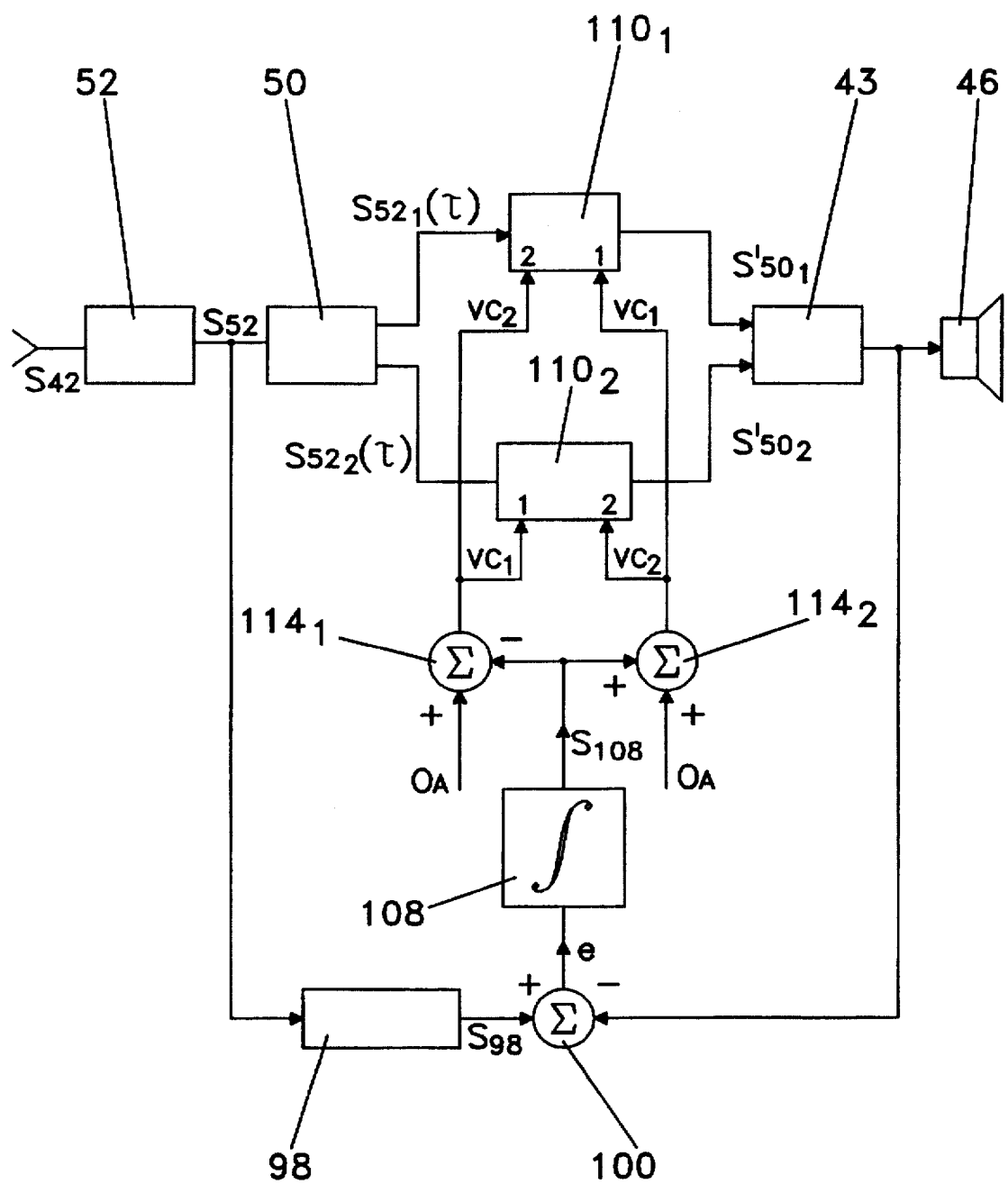
FIG. 18 shows a first and preferred realization form of the technique according to FIG. 17 in a simplified functional block diagram representation.

In FIG. 18 a preferred realization form of a technique of negative feedback with a reference processing unit, as was explained with the help of FIG. 17, is shown. Thereby, adjusting the processing characteristic of the high-power processing unit is performed by adjusting the pulse widths of the pulse width modulated signals $S50_1$, $S50_2$ as generated with the modulator unit 50 according to FIG. 4.

According to FIG. 18, the output signal $S_{52}$ of the noise-shaping unit 52 is led to the modulator unit 50 which is, as was mentioned, preferably realized as shown in FIG. 4. Modulator unit 50 generates the two output signals, namely the two pulse width modulated signals $S50_1$, $S50_2$. Signal $S_{52}$ is led to the low-power reference processing unit 98 which generates the signal $S_{98}$. This signal is compared at comparator unit 100 with the respective high-power signal tapped off at the output of output switching unit 43. The control deviation or error signal e from the output of difference forming unit 100 is fed to a filter unit 108, outputting the filtered error signal according to $S_{108}$. This signal is fed via a first adding unit $114_1$ to a pulse length adjusting unit $110_1$ and via a second adding unit $114_2$ to a second pulse length adjusting unit $110_2$, the two units 110 being respectively provided in the signal paths for the signals $S50_1$ and $S50_2$. The output signals $S'50_1$ and $S'50_2$ are, as was previously described, fed to the switched output unit 43 as shown in a preferred mode in FIG. 6.

At the two adding units $114_1$ and $114_2$ there is applied to the error signal $S_{108}$ an offset signal $O_A$, according to which impulses at both signals $S50_1$ and $S50_2$ are time-delayed by the according amount $\tau_A$ at the units $110_1$, $110_2$. This to become able to consider at the units 110 error signals of both signums by appropriate lengthening and shortening the pulse length τ of $S50_1$, $S50_2$.

At the adding unit $114_1$, the error signal $S_{108}$ is substracted from the offset signal $O_A$, whereas at the adding unit $114_2$ such offset signal $O_A$ is added to the error signal $S_{108}$. Thus, at unit $110_1$ for positive error signals, the length τ of the incoming signal $S50_1$ is shortened by the adjusting time span $\tau_e$ according to the error signal, and for such positive error signal the length $\tau$ of incoming signal $S50_2$ is lengthened at the unit $110_2$. The inverse occurs for negative error signals.

Figure 23:
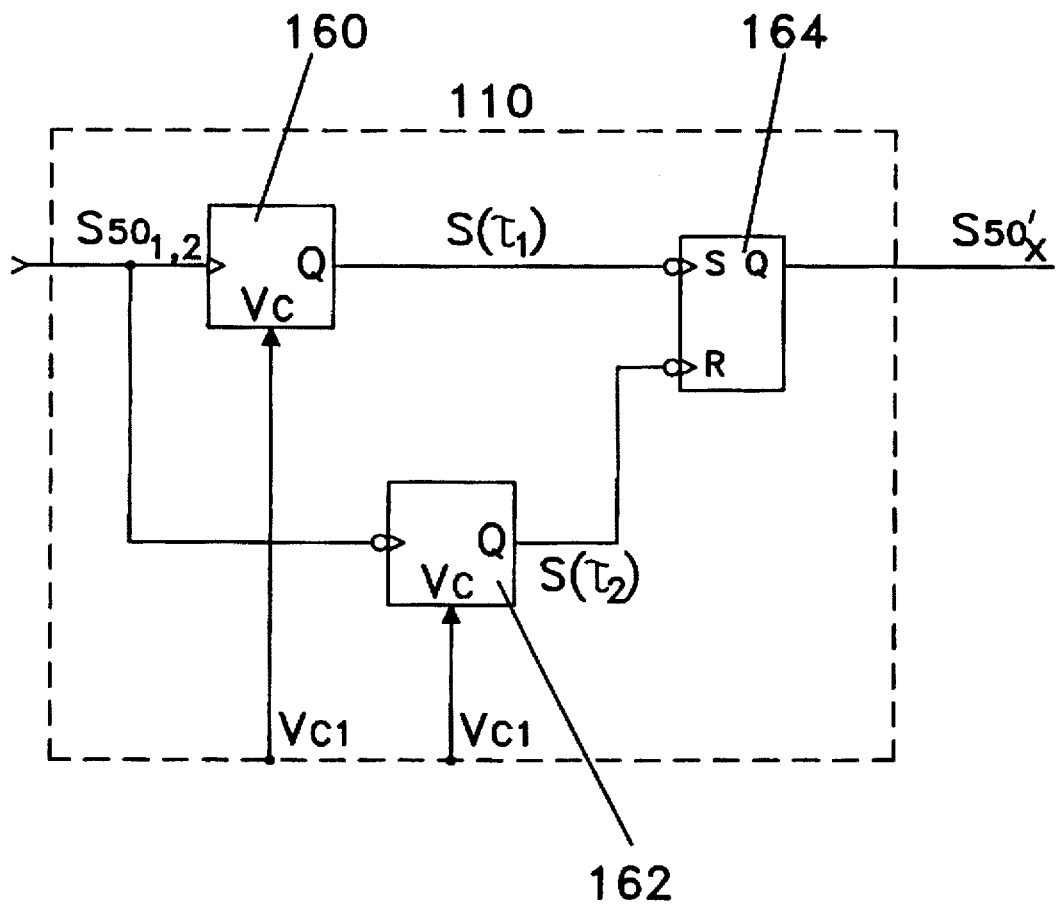
FIG. 23 a preferred form of realization of control pulse and phase shifter units as used in the embodiment of FIG. 18.

In FIG. 23 there is shown a preferred realization form of either units $110_1$ and $110_2$ of FIG. 18. The respective signal $S50_{1,2}$ is led on a monostable multivibrator 160 emitting a one-shot, the length of which being controlled by a signal applied to $VC_1$.

The input signal $S50_{1,2}$ is further led to the trigger input of a further monostable multivibrator 162, the length of its output shot being controlled by a signal applied to $VC_2$. The output signals of the monostable multivibrators 160 and 162 are led respectively to S and R inputs of an R/S bistable monovibrator or flip-flop 164 emitting the respective signals $S50_{1,2}$. The unit $110_1$ has, with respect to the control inputs $VC_1$ and $VC_2$, the inputs inverse with respect to unit $110_2$. Thus, at the monoflop 160, respectively, the output signal is a one-shot of the length $\tau_1$ or $\tau_2$, respectively controlled by $VC_1$ and $VC_2$.

Figure 24:
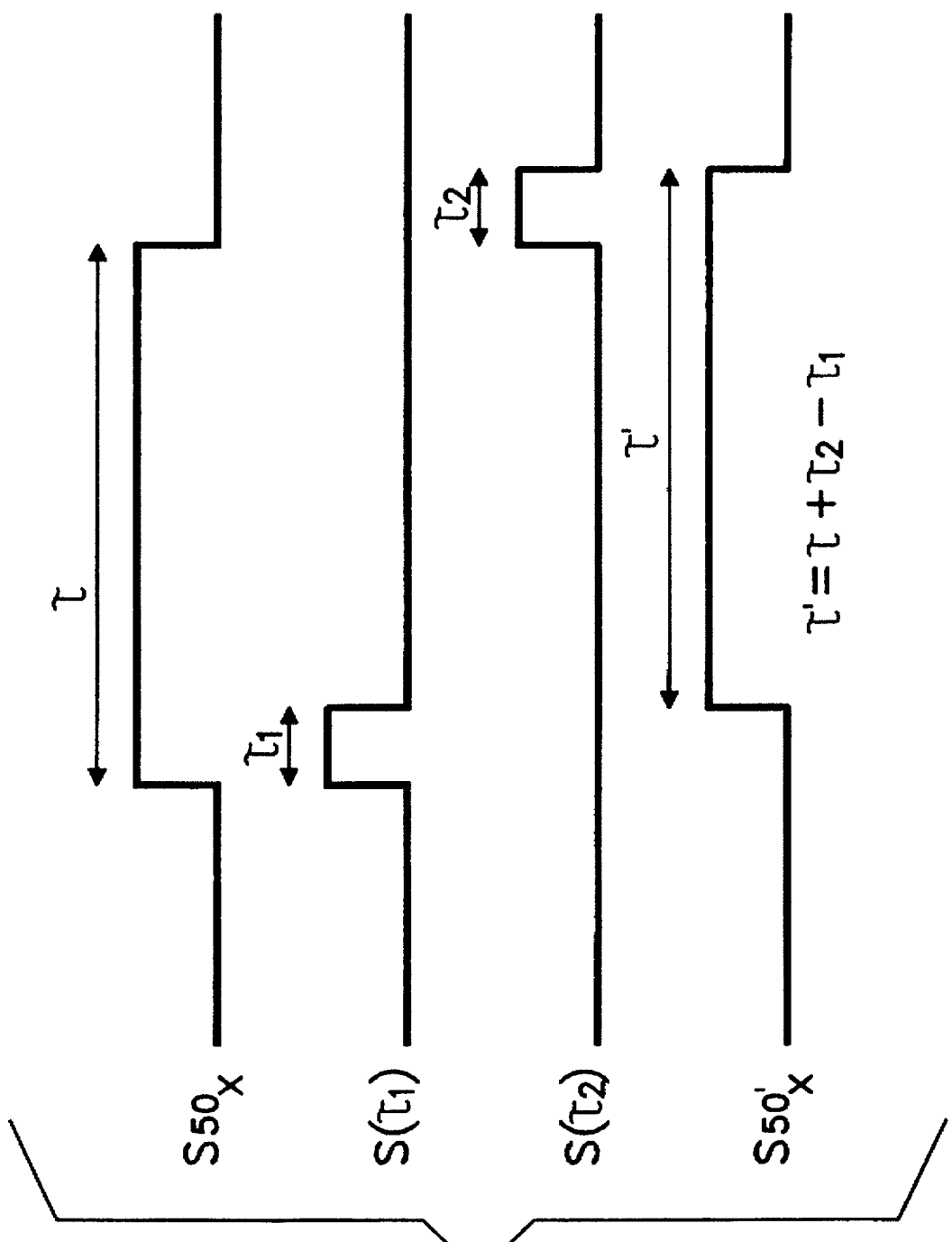
FIG. 24 for explanatory purposes, the time diagrams of signals generated at the unit according to FIG. 23.

In FIG. 24, an explanatory time diagram of the signals realized by the units 110 according to FIG. 23 is shown.

Figure 19:
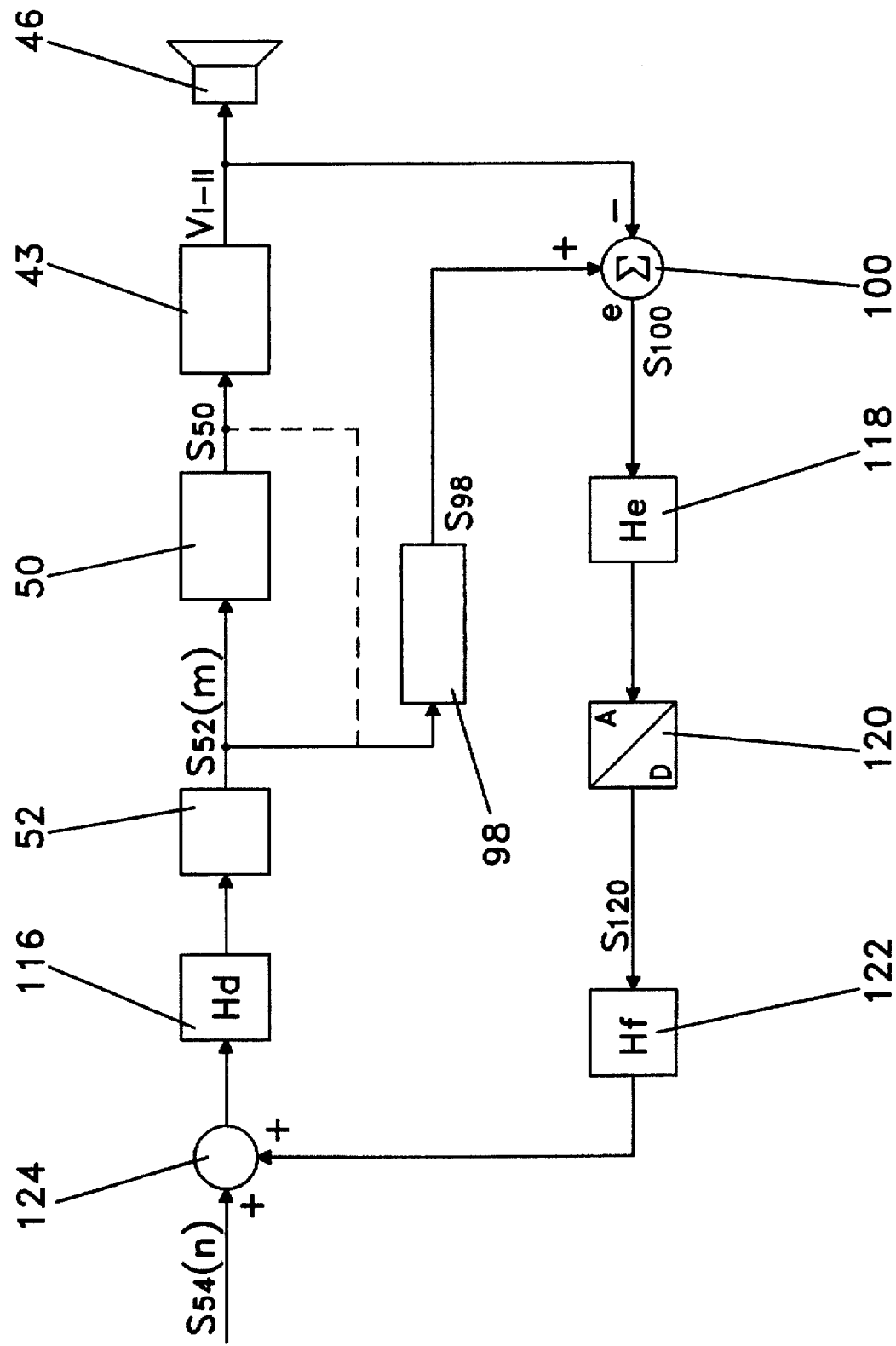
FIG. 19 shows in a simplified block diagram representation a further realization form of the technique according to FIG. 17.

In FIG. 19, still departing from the general approach according to FIG. 17, an embodiment is shown where the adjusting signal is digital. The higher bit number data words $S_{54}$ at the input side of the noise-shaping unit 52 are led via a filter unit 116 to the noise-shaping unit 52, then to the modulator unit 50, the switched output stage 43 and finally to the output transducer 46. The low bit number data words of $S_{52}$ or the modulated signals $S50_1$, $S50_2$, as schematically shown in dashed lines and with $S_{50}$, are fed to the reference transmission unit 98 which, in the latter case, is a low-power switching unit according to high-power unit 43. The output of unit 98 acts together with the output of switching unit 43 on the difference forming unit 100 according to FIG. 17. The output error signal e, according to $S_{100}$, is fed via a filter unit 118 to an analog-to-digital converter unit 120, the output of which being fed via a further filter unit 122 to an adding unit 124 performing digital addition. The filter units 116, 118 and 122 cooperate so as to obtain the same equivalent loop gain as realized in the embodiment according to FIG. 17 by means of filter unit 102. Further, filter unit 118 is necessary to perform anti-aliasing before analog-to-digital conversion at unit 120. The filter unit 116 is optional, but can be provided for equalizing.

As the input to the reference transmission unit 98 is taken from the low bit data word at the output of noise-shaping unit 52, the same advantages with respect to reduced bit number treatment as in the embodiment of FIG. 18 are obtained. The filter units 116 and 122 can further be combined with the internal topology of the noise-shaping unit 52 by means of known block diagram-algebra yielding topologies which are different from the one represented in FIG. 19. The analog-to-digital converter 120 must only convert the analog error signal e and no full signal and thus may be realized with a low resolution.

All the techniques for improving the hearing aid device according to the present invention with a digitally controlled switched output stage 43 as with respect to switching mode, compensation of voltage supply variations, calibration of pulse width modulation etc., as were described in different embodiments, may be combined and optimized as will become apparent to the skilled artisan.

Figure 20:
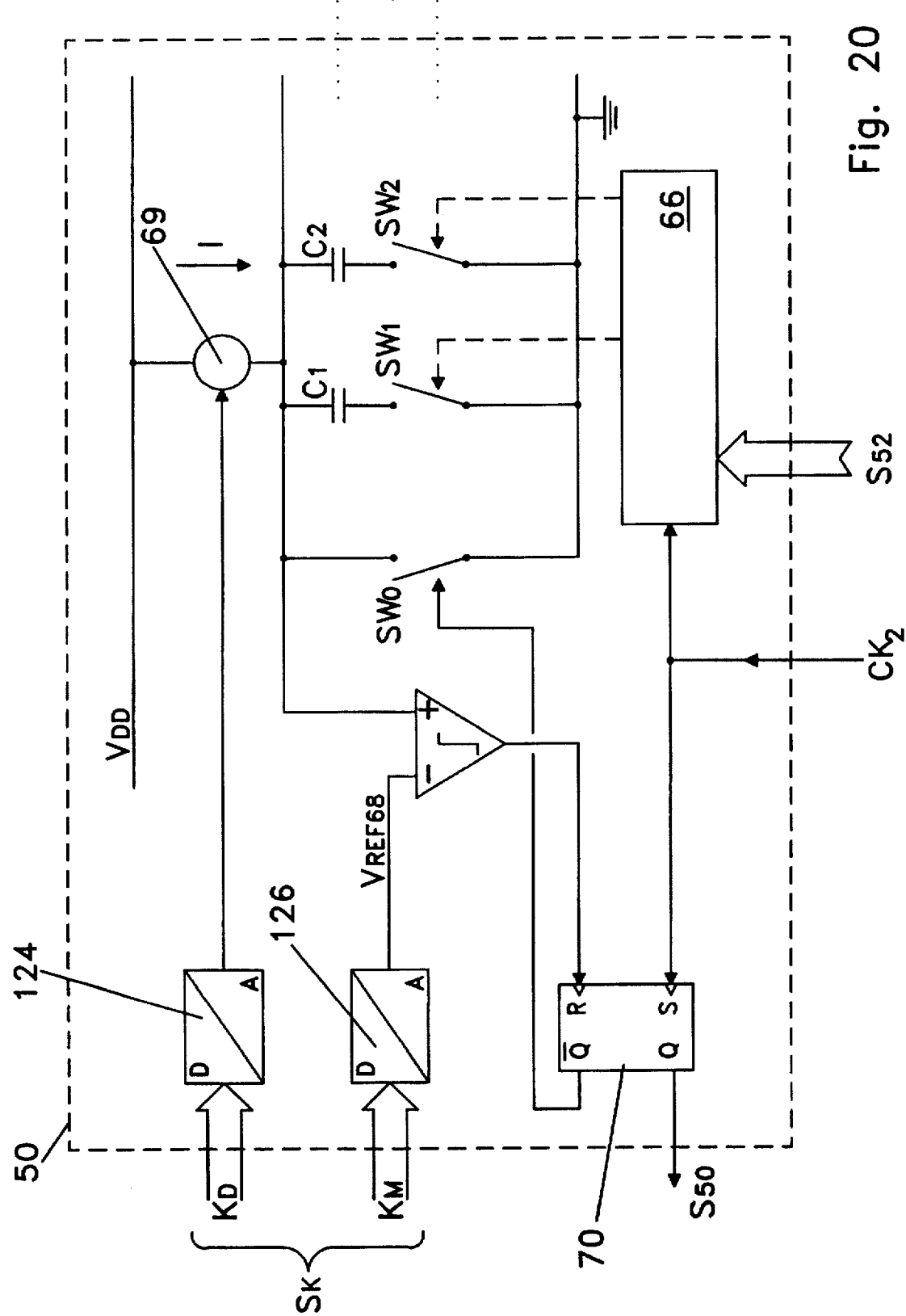
FIG. 20 shows in a simplified representation of the modulator unit according to FIG. 5 provision of further control inputs.

In FIG. 20 there is shown a further realization form of the modulator unit 50 departing from the principles according to FIG. 5. The scaling technique with $C_{ref}$ of FIG. 5 is not shown here again for sake of clearness. A control data word $S_k$ controls via a first digital-to-analog converter 124 current source 69 and via a second digital-to-analog converter 126 the reference voltage at the input of comparator 68. Thereby, by the two inputs $K_D$ and $K_M$, the equivalent gain of the pulse width modulation process can be controlled. The input $K_D$ controls the charging current I of source 69, whereas the input $K_M$ controls the voltage level to which the capacitors, according to FIG. 5, must be charged before resetting the bistable unit 70. Thus, the pulse width of the pulse width modulated signal $S_{50}$ becomes $$\tau = \alpha(K_M/K_D)[S_{52}].$$

Thereby, the converter 124 may be implemented together with the controlled current source 69 as an array of switches switching elementary current sources to the capacitor array. The digital-to-analog converter 126 can thereby be realized as an array of switched resistors as voltage dividers.

Figure 21:
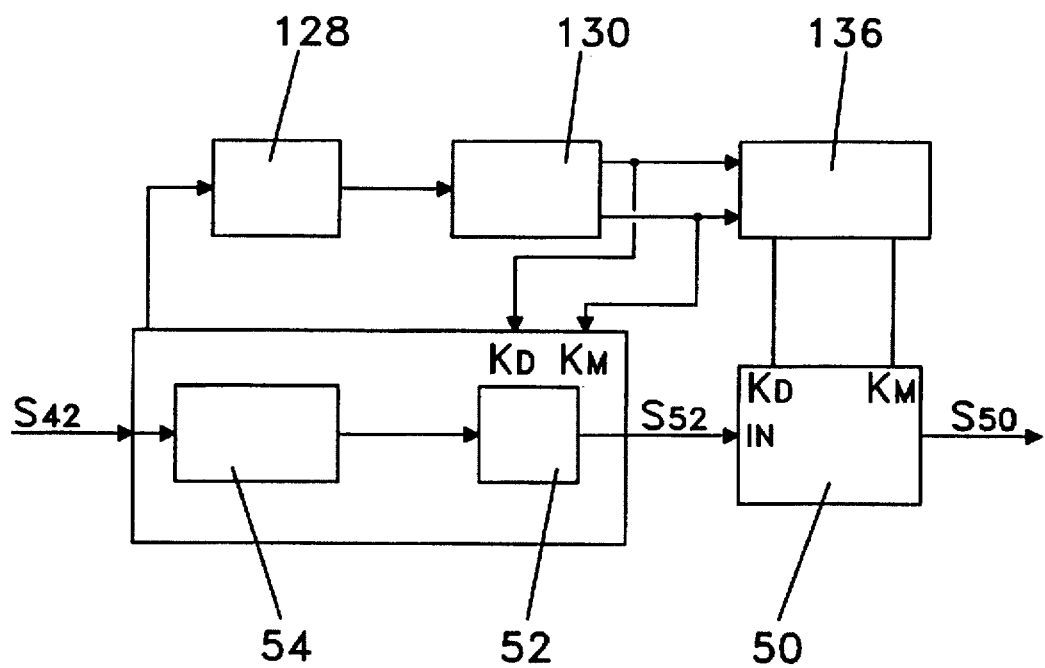
FIG. 21 shows in a simplified block diagram representation gain control as a further improvement of the inventive device according to FIG. 2 for improving signal-to-noise ratio.

In FIG. 21 the principle as realized by the embodiment according to FIG. 20 is shown in a generic block diagram representation. To improve the dynamic range, there is provided a level detector unit 128 which measures the signal level at an appropriate point along the transmission units 54 and 52. The output of the level detector unit 128 controls a gain control block 130 so that the signal level of $S_{52}$ is kept as high as possible. The upsampling and interpolation unit 54 and the noise-shaping unit 52 are implemented such that two control inputs $K_D$ and $K_M$ control the gain. The effect of these two inputs on the transmission of the units 54 and 52 is such that there becomes valid in the audio frequency band:

$$S_{52} = (K_D/K_M) \cdot S_{42} + N_Q,$$

where $N_Q$ is quantification noise.

As the modulator unit 50 has an amplification controlled by $K_M/K_D$, the overall gain between $S_{50}$ and $S_{42}$ in the audio band remains constant irrespective of the instantaneous input signal level. The noise level of the signal $S_{52}$ in the audio band is practically independent of the signal level itself. By maximizing the signal level of $S_{52}$ therefore, the signal-to-noise ratio of the overall processing line is maximized. The control of the units 54, 52 by $K_D$, $K_M$ can be achieved by straightforward multiplication and division along the signal path up to the input of the unit 52.

Figure 22:
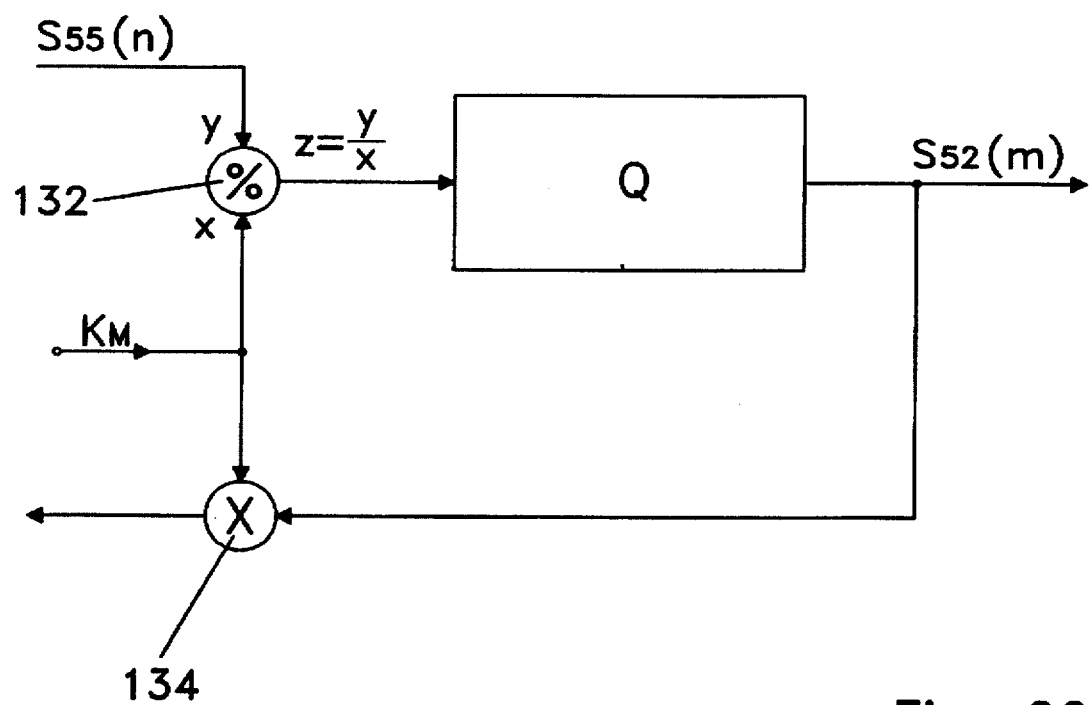
FIG. 22 shows at a noise-shaper unit as used in the inventive device according to FIG. 2 further control improvement.

The division by $K_M$ can further be realized by replacing the quantizer 55 of FIGS. 3, 15 or 16 by the topology as shown in FIG. 22. The output signal of the filter 54, $S_{54}(n)$, is fed to a divider unit 132 where it is divided by the value $K_M$. By means of the multiplication unit 134 which multiplies the output signal $S_{52}(m)$ of the quantizer 55' with $K_M$, the output signal of unit 134 makes sure that there is maintained a constant open-loop gain over the noise-shaping negative feedback loop, even if $K_M$ varies over a wide range.

Back to FIG. 21, there is further provided a delay compensation unit 136 which compensates for a signal delay between the time when $K_D$ and $K_M$ gain control over the signal at the units 54 and 52 and $K_D$, $K_M$ gain control over the same signal at modulator unit 50. It is obvious that not necessarily both control signals $K_D$ and $K_M$ have to be used.

Looking back on the generic principle of the present invention according to FIG. 2, it must be noted that, if the low-bit data word $S_{52}$ consists of only very few bits, let us say $1 \leq m \leq 2$, that then the signal $S_{52}$ may directly be connected as switch-over control signal to the control input of switching unit 43, and in such case no additional pulse width modulator unit 50 is needed, the pulse width modulating unit being in fact formed by the noise-shaper unit 52 directly.

We claim:

1. A hearing aid device with a mechanical/electrical input converter and at least one electromechanical output transducer, said hearing aid device comprising: a signal processing unit with an input connected to the output of said input converter and having a switched output unit with a switch-over control input, the output of said switched output unit being operationally connected to the input of said at least one electromechanical output transducer; said switched output unit generating at its output an output signal switched between at least two predetermined signal levels, said processing unit further comprising a pulse width modulator unit generating a pulse width modulated output signal, the output of said pulse width modulator unit being operationally connected to said switch over control input of said switched output unit, said pulse width modulator unit comprising a digital control input for controlling pulse width modulation.

2. The device of claim 1, wherein said digital control input of said modulator unit is operationally connected to the output of a digital noise-shaping unit which generates at its output m-bit data words in dependency on n-bit data words at its input and wherein there is valid:

$n>m$.

3. The device of claim 2, wherein said n-bit data word input to said noise-shaping unit is operationally connected to the output of an upsampling and interpolation unit.

4. The device of claim 1, wherein said switched output unit generates a three-level output signal, two of said levels being symmetric with respect to the third signal level.

5. The device of claim 1, wherein said pulse width modulator unit generates a pulse width modulated signal with a pulse repetition period controlled by a clock signal applied to said pulse width modulator unit, and wherein modulation of pulse width is performed symmetrically to a predetermined phasing within said pulse repetition period.

6. The device of claim 1, further comprising a reference voltage source generating a reference voltage substantially independent of the output voltage of a power supply unit for said switching unit, a quotient forming unit, one input of which being operationally connected to the output of said substantially independent reference voltage source, the second input of which being operationally connected to the output voltage of said power supply, the output of said quotient forming unit being operationally connected to the control input of a signal amplification unit, the signal input of which being operationally connected to the output of said input converter, the output of which being operationally connected to the switch-over control input of said switched output unit.

7. The device of claim 6, wherein said connection of said one input of said quotient forming unit to the output of said power supply is led via an enabling unit, said output transducer being disconnected from said power supply during time spans of pulse width modulation cycles, said enabling unit being controlled to enable said connection during said time spans.

8. The device of claim 6, wherein said amplification unit comprises a pulse-width-adjusting unit at said modulator unit for additionally adjusting said pulse width controlled by a signal at said digital control input of said pulse width modulator unit.

9. The device of claim 6, comprising a noise-shaping unit with an input for a n-bit data word and an output for a m-bit data word, wherein n>m, the output of said noise-shaping unit being operationally connected to a control input of said switched output unit, the input of said noise-shaping unit being operationally connected to the output of said input converter, said amplification unit being provided within said noise-shaping unit, which latter having a further input operationally connected with the output of said quotient forming unit.

10. The device of claim 1, said pulse width modulator unit having at least two inputs for controlling pulse width of the output pulse width modulated signal, one of said at least two inputs being operationally connected to the output of said input converter, the second of said control inputs being operationally connected to an error detecting circuit for automatic compensation of errors detected by said error detector circuit by means of adjusting the pulse width of said output pulse width modulated signal, additionally to its control in dependency on the output signal of said input converter.

11. The device of claim 1, further comprising a reference pulse generating unit, said modulator unit generating a calibration pulse, a comparator unit comparing the pulse width of said reference pulse and of said calibration pulse, the output of said comparator unit being operationally connected to an adjusting unit for adjusting pulse width modulation of said pulse width modulator unit.

12. The device of claim 1, said pulse width modulator unit comprising an addressable memory unit with an addressing input operationally connected to the output of said input converter, the parallel output data sets of said memory unit being input into a register unit and serially output therefrom as pulse width modulated output signals.

13. The device of claim 1, wherein said pulse width modulator unit is formed by a noise-shaping unit which generates at its output a m-bit word with $1 \leq m \leq 2$.

14. The device of claim 1, wherein said modulator unit comprises a voltage ramp generator unit, the output thereof being connected to one input of a comparator unit, the second input thereof being connected to the output of a reference signal source, the output of said input converter being operationally connected to a control input for controlling the length of impulses at the output of said comparator unit by adjusting at least one of ramp-rising rate and of said reference voltage source.

15. The device of claim 6, wherein said amplification unit is formed by said modulator unit.

16. The device of claim 6, wherein said amplification unit is provided in a feedback loop of a noise-shaping unit, said noise-shaping unit comprising a control input operationally connected to the output of said quotient forming unit, further a signal input operationally connected to said input converter and a signal output operationally connected to the digital input of said modulator unit.

17. The device of claim 16, said noise-shaper unit comprising a control input being on one hand connected to one input of a multiplication unit within said feedback loop and on the other hand to a divider unit at the input side of a quantizer unit of said noise-shaper unit.

18. The device of claim 6, wherein said substantially independent reference voltage and said voltage dependent on output voltage of said power supply are respectively operationally connected to a signal input and a reference voltage input of an analog-to-digital converter, the output thereof being operationally connected to said amplification unit.

19. The device of claim 1, at least a part of said units operationally connected between said input converter and said output transducer forming a high-power processing line and wherein further the output of said input converter is operationally connected to a reference processing line modelling processing by said high-power processing line at a lower power level, the output of said reference processing line being operationally connected to one input of a comparator unit, the second input thereof being operationally connected to the output of said switched output unit, the output of said comparator unit being operationally connected to at least one control input of at least one processing unit of said high-power processing line.

20. The device of claim 19, said pulse width modulator unit having a pulse width adjusting input additionally to a pulse width modulation control input, being said control input of said at least one processing unit.

21. The device of claim 1, further comprising a signal level detector unit, the output thereof controlling gain of signal processing at first processing units, the input of which being operationally connected to the output of said input converter and inversely controlling gain at second processing units, the input of which being operationally connected to the output of said first processing units.

22. The device of claim 1, wherein said modulator unit comprises a voltage ramp generator unit, the output thereof being connected to one input of a comparator unit, the second input thereof being connected to the output of a reference signal source, the output of said input converter being operationally connected to a control input for controlling the length of impulses at the output of said comparator unit by adjusting at least one of ramp-rising rate and of said reference voltage source; and wherein said amplification unit is formed by said modulator unit.

* * * * *